United States Patent
Gushima et al.

(10) Patent No.: US 7,277,368 B2
(45) Date of Patent: Oct. 2, 2007

(54) PLAYBACK METHOD, PLAYBACK CONTROL CIRCUIT AND PLAYBACK APPARATUS FOR A RECORDING MEDIUM

(75) Inventors: Toyoji Gushima, Osaka (JP); Makoto Usui, Osaka (JP); Yuji Takagi, Osaka (JP); Yuichi Hashimoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 636 days.

(21) Appl. No.: 10/702,618

(22) Filed: Nov. 7, 2003

(65) Prior Publication Data

US 2004/0136288 A1 Jul. 15, 2004

(30) Foreign Application Priority Data

Nov. 11, 2002 (JP) ............................ P2002-326492
Nov. 12, 2002 (JP) ............................ P2002-328054

(51) Int. Cl.
G11B 7/00 (2006.01)
(52) U.S. Cl. ................. 369/47.34; 369/53.34; 369/47.28; 369/30.23
(58) Field of Classification Search .......... 369/53.34, 369/47.34, 30.23, 47.28
See application file for complete search history.

(56) References Cited

U.S. PATENT DOCUMENTS

| | | | |
|---|---|---|---|
| 4,802,152 A * | 1/1989 | Markvoort et al. ...... 369/30.22 |
| 5,589,995 A * | 12/1996 | Saito et al. ................... 360/48 |
| 5,655,050 A | 8/1997 | Yamamoto et al. |
| 5,732,066 A | 3/1998 | Moriya et al. |
| 5,793,724 A * | 8/1998 | Ichikawa et al. ......... 369/47.31 |
| 5,881,037 A * | 3/1999 | Tanaka et al. ............ 369/59.24 |
| 5,946,443 A | 8/1999 | Oh |
| 6,236,631 B1 | 5/2001 | Deguchi et al. |
| 6,314,078 B1 * | 11/2001 | Takagi et al. ............ 369/275.3 |
| 6,378,100 B1 | 4/2002 | Van Dijk et al. |
| 7,158,464 B2 * | 1/2007 | Gushima et al. ......... 369/59.25 |
| 2001/0006499 A1 * | 7/2001 | Hayashi et al. ......... 369/47.34 |
| 2002/0105869 A1 | 8/2002 | Oh |
| 2006/0098558 A1 * | 5/2006 | Kobayashi et al. ...... 369/275.1 |

FOREIGN PATENT DOCUMENTS

CN 1173710 2/1998

(Continued)

OTHER PUBLICATIONS

English language Abstract of CN 1368724.

(Continued)

*Primary Examiner*—Wayne Young
*Assistant Examiner*—LaTanya Bibbins
(74) *Attorney, Agent, or Firm*—Greenblum & Bernstein, P.L.C.

(57) ABSTRACT

Stable playback performance is assured and data loss due to out-of-step synchronization is reduced even when playback signal quality deteriorates due to such cause as a recording medium defect. The playback method applies to a recording medium to which data is recorded in block units containing multiple fixed-length frames together with block address information. The data and the block address information are acquired from the recording medium. The recording position of each frame in a block is then predicted from the acquired block address information. Synchronization is then set to the frame level based on the acquired data, and the memory address for storing the acquired data is determined based on the predicted recording position. The acquired data is then stored at the determined memory address.

23 Claims, 26 Drawing Sheets

FOREIGN PATENT DOCUMENTS

| | | |
|---|---|---|
| CN | 1368724 | 9/2002 |
| JP | 63-157372 | 6/1988 |
| JP | 11-176081 | 7/1999 |
| JP | 2001-515642 | 9/2001 |

OTHER PUBLICATIONS

English language Abstract of CN 1173710.
English Language Abstract JP11-176081.
English Language Abstract JP63-157372.
An article entitled "Optical Disc System For Digital Video Recording" by T. Narahara et al., published in *Part of the Joint International Symposium on Optical Memory and Optical Data Storage 1999*, vol. 3864, pp. 50-52, Koloa, Hawaii, Jul. 1999.
An article entitled "Error Modeling and Performance Analysis of Error Modeling and Performance Analysis of Error Correcting Codes for the Digital Video Recording System" by K. Yamamoto et al., published in *Part of the Joint International Symposium on Optical Memory and Optical Data Storage 1999*, vol. 3864, pp. 339-341, Koloa, Hawaii, Jul. 1999.
English language Abstract of CN 1368724, no date.
English language Abstract of CN 1173710, no date.
English Language Abstract JP11-176081, no date.
English Language Abstract JP63-157372, no date.
An article entitled "Optical Disc System For Digital Video Recording" by T. Narahara et al., published in *Part of the Joint International Symposium on Optical Memory and Optical Data Storage 1999*, vol. 3864, pp. 50-52, Koloa, Hawaii, Jul. 1999.
An article entitled "Error Modeling and Performance Analysis of Error Correcting Codes for the Digital Video Recording System" by K. Yamamoto et al., published in *Part of the Joint International Symposium on Optical Memory and Optical Data Storage 1999*, vol. 3864, pp. 339-341, Koloa, Hawaii, Jul. 1999.

* cited by examiner

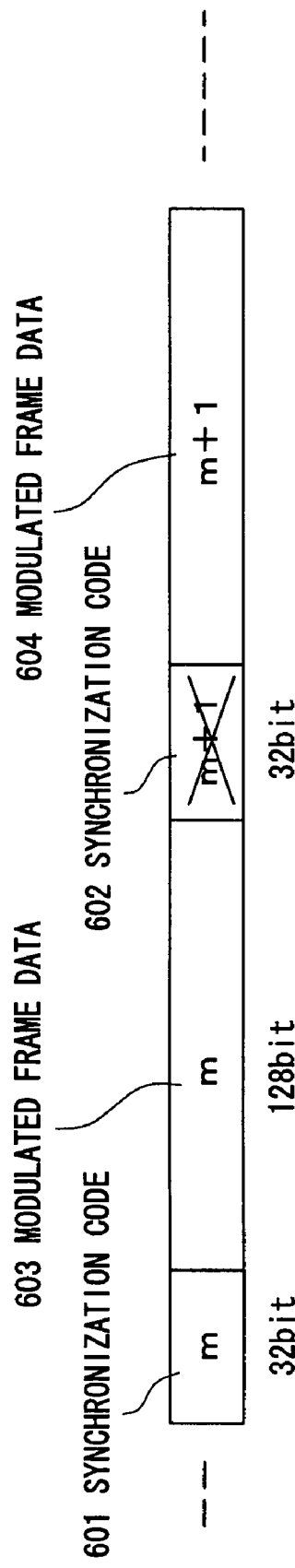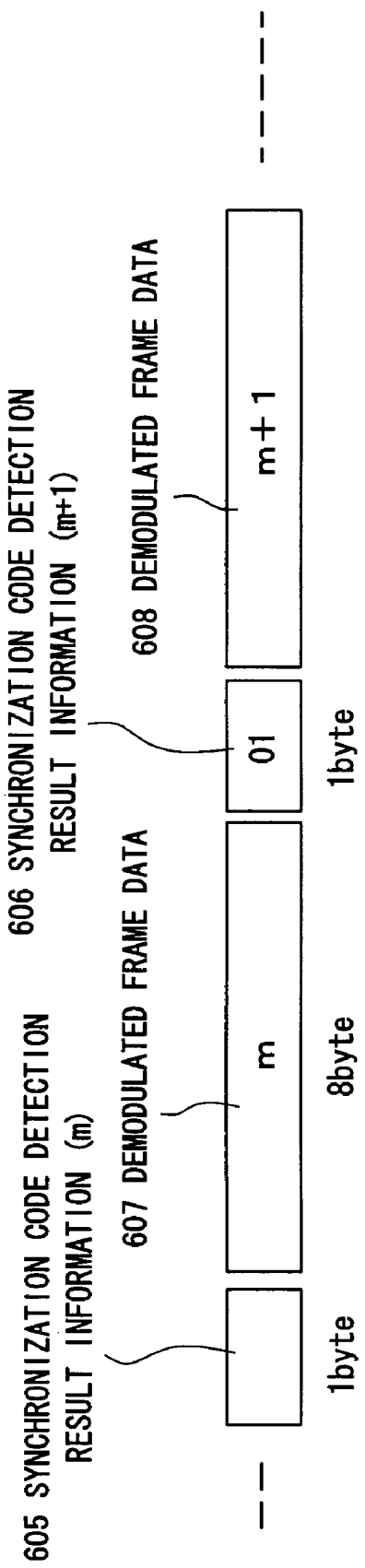

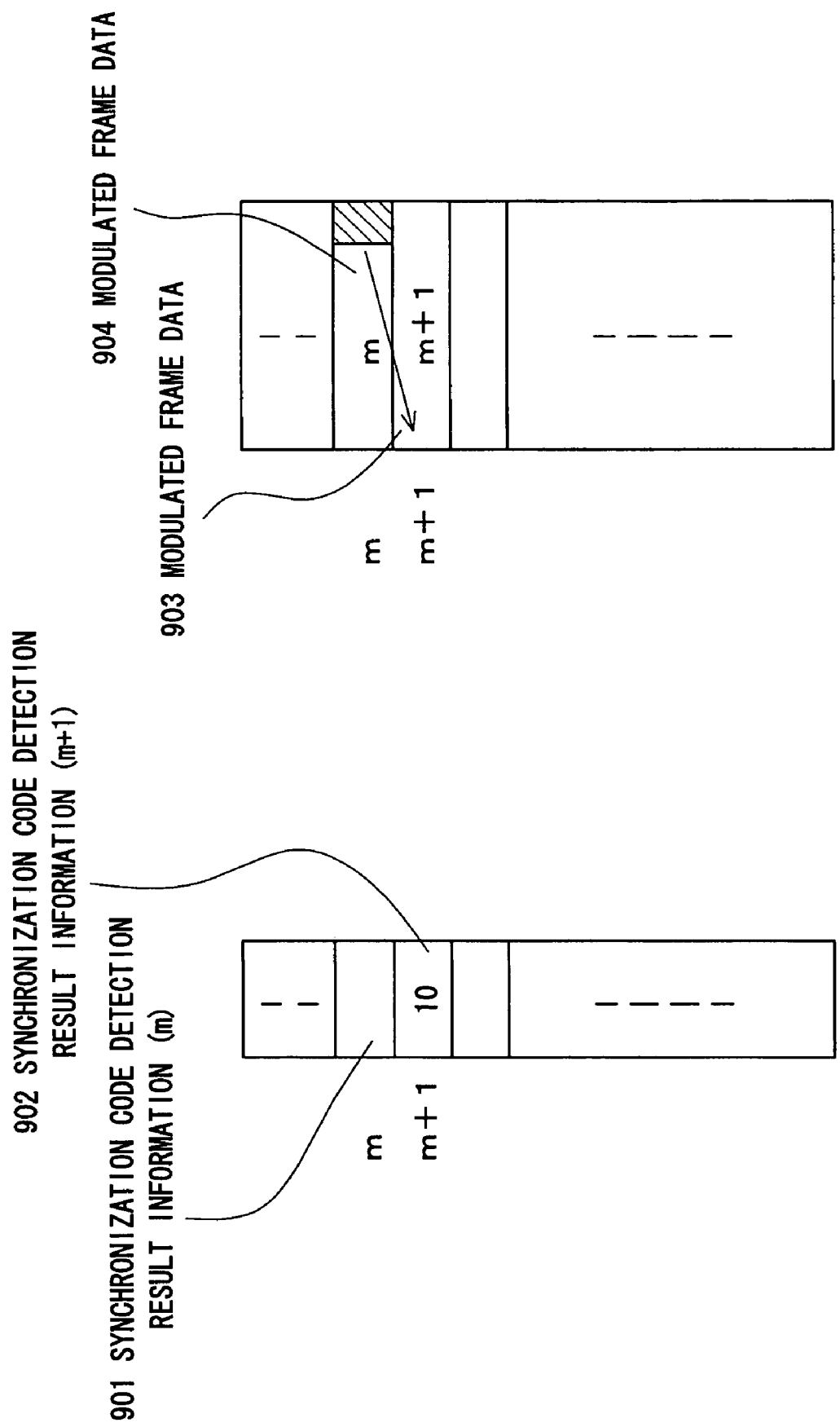

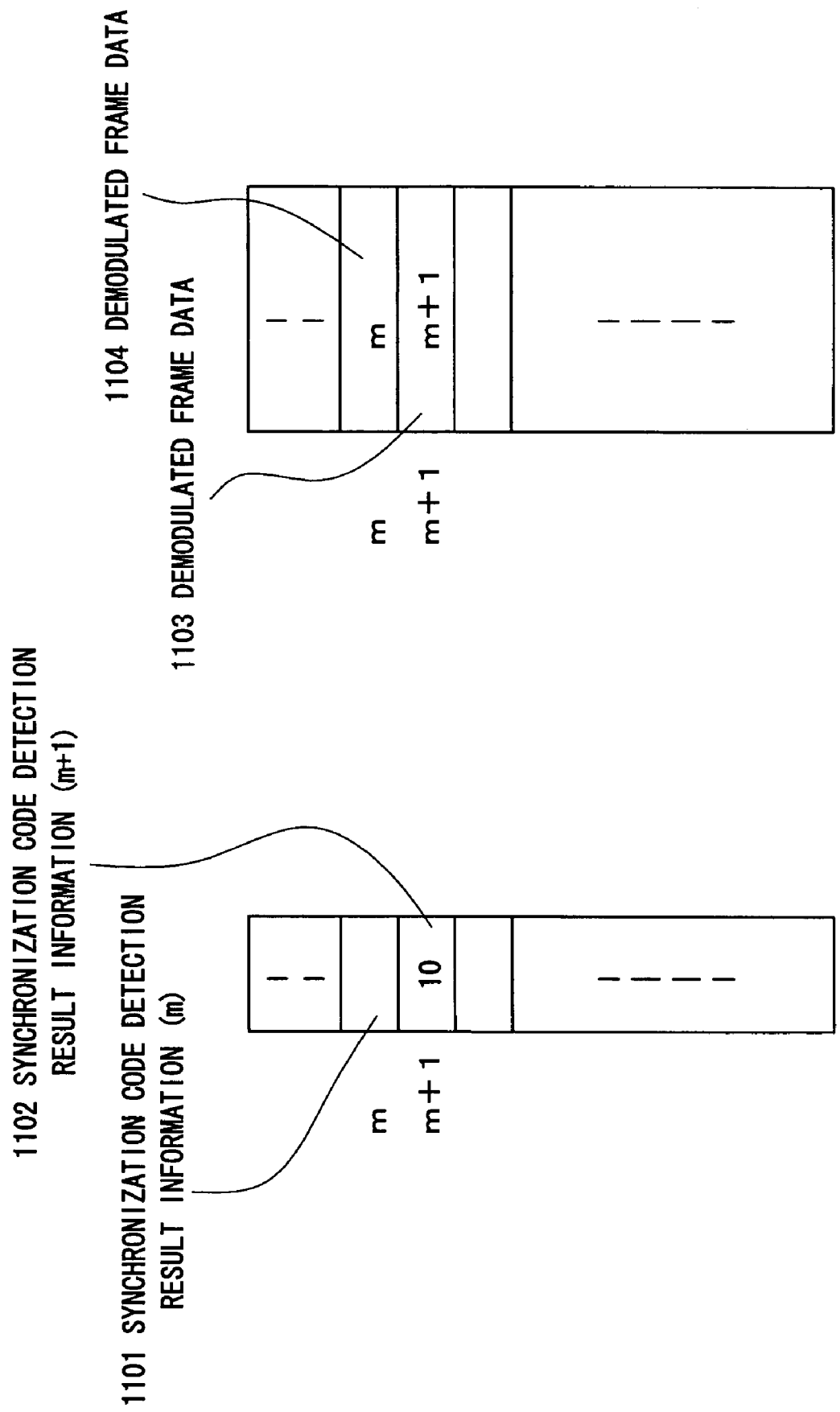

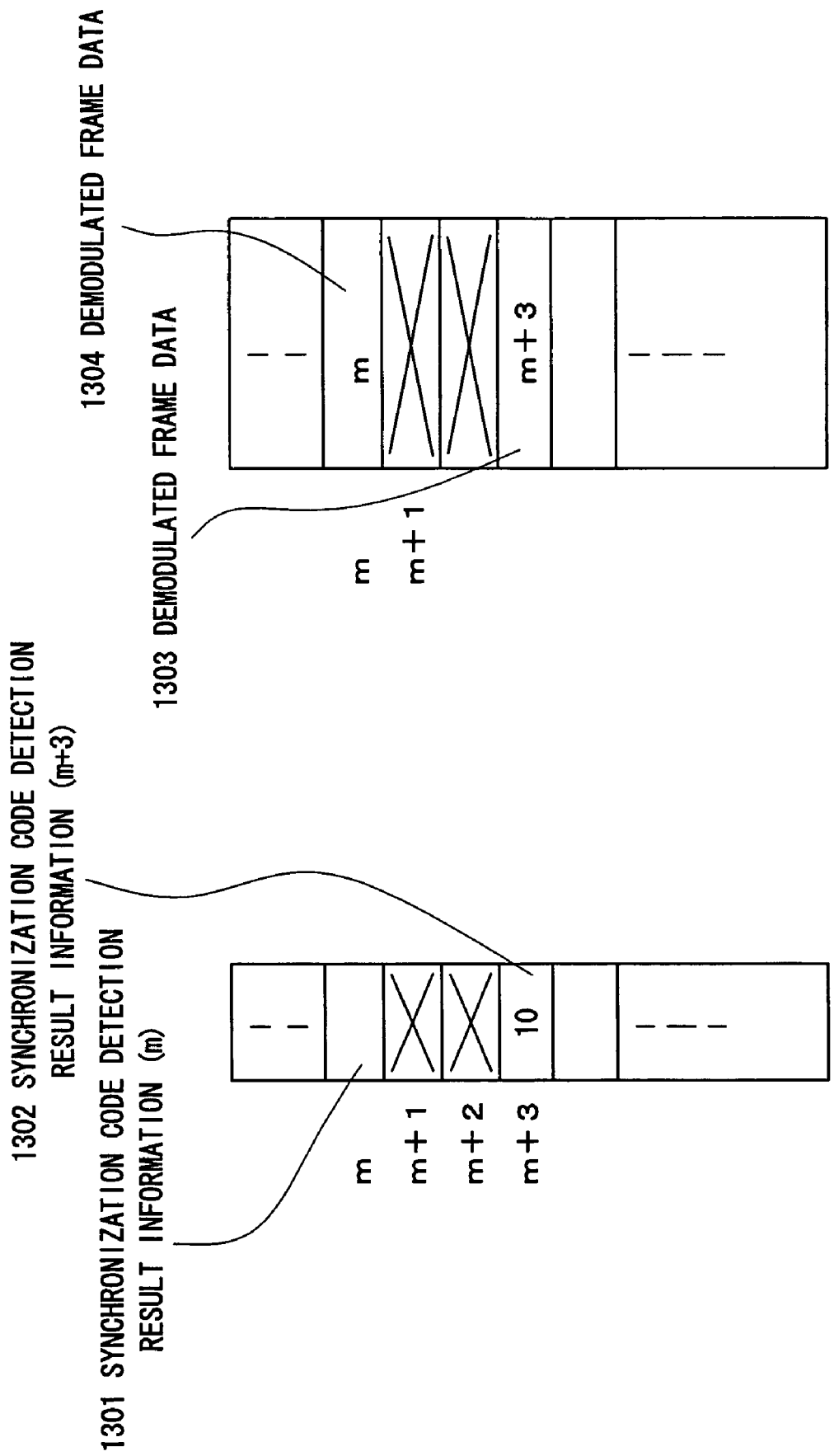

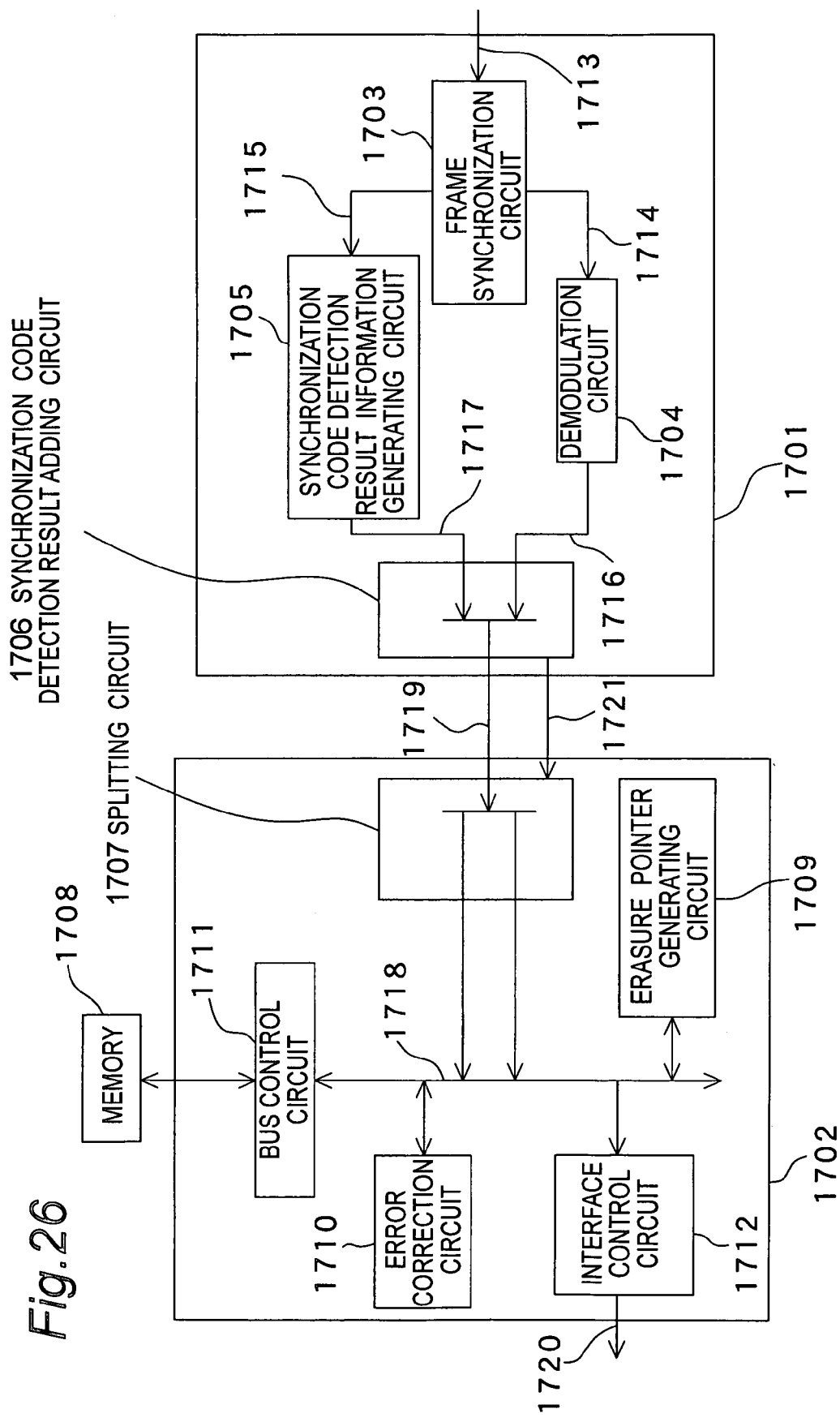

PLAYBACK METHOD, PLAYBACK CONTROL CIRCUIT AND PLAYBACK APPARATUS FOR A RECORDING MEDIUM

BACKGROUND OF THE INVENTION

1. Technical Field of the Invention

The present invention relates generally to a method and an apparatus for reproducing information recorded to a recording medium for digitally recording information. More specifically, the invention relates to a method and an apparatus for reproducing data recorded in block units recorded to a recording medium having prerecorded address information, each block containing a plurality of specific frame units associated with the address information. The invention also relates to a playback method, a playback control circuit and playback apparatus for reproducing data from a recording medium, such as magnetic recording media and optical discs, to which error-correction coded data is recorded distributed among plural frames.

2. Background Art

As data transmission technologies have followed a singular path towards higher speed and greater capacity with the development of the information society, the need for faster, higher capacity recording media for recording and storing this information has also grown.

Data is generally recorded, reproduced, and managed in block units of a specific byte length on recording media for recording digital information. Examples of such recorded data include:

(1) All types of user data, including digital audio, video, and computer data (2) Error correcting code (parity code) for detecting or correcting data errors during data playback operations (3) Redundant data such as data IDs for identifying where data is recorded. This data is recorded as a coded stream after conversion to modulated code according to the read/write signal characteristics of the recording medium. A synchronization code is often encoded and then inserted at regular intervals in the modulated code stream and recorded embedded in the modulated code.

The synchronization code is used to assure correct data synchronization when reading data. The playback drive reads the data ID after frame synchronization, detects the recording address identifying where the data is recorded, and then demodulates and corrects for errors in the required playback data to acquire the original data.

One method used to record the synchronization code is recording a specific pattern at the beginning of a data frame of a known unit byte length. A pattern that does not exist in the modulated code stream is used for the synchronization pattern. The synchronization code is a combination of this specific pattern and a type identifier so that the location of the frame in a block can be known by decoding the type identifier in a synchronization code for either a single frame or for multiple consecutive frames.

This is described below using by way of example the physical format of DVD (=Digital Versatile Disc) media, a multipurpose optical disc medium that is becoming increasingly popular. Run-length limited (RLL) coding in which mark length and space length is limited to the range 3T to 11T (T being the channel bit period) is used for the modulated code stream, and a unique 14T pattern that therefore does not exist in the modulated code stream is used as a synchronization code at the beginning of the frame. One sector consists of 26 consecutive frames, each frame containing 2048 bytes of user data. A data ID identifying the data is assigned to each sector. One block contains 16 consecutive sectors, and encoding/decoding the error correcting code is done by block unit. The frame start synchronization code includes one of eight predefined type identifiers placed before the unique 14T synchronization code pattern. These eight synchronization codes are labelled SY0, SY1, SY2, SY3, SY4, SY5 SY6, SY7. The first frame in each sector includes the data ID of the SY0 synchronization code location, and the remaining 25 frames contain one of synchronization codes SY1 to SY7.

A drive for reading this type of optical disc can therefore determine the first frame in a sector by reading synchronization code SY0, can know where data is recorded by reading the data ID, and can use this information for search (seek) operations. The frame location within a sector can also be known by correctly reading the type identifiers for three consecutive frames other than frame SY0.

Storage media such as recordable optical discs that can be written by the user have unique address information prerecorded to the data recording tracks in a form (such as a different groove configuration) different from that used to record data (such as a phase change in the recording film). Data is recorded with a link to the pre-recorded address information, and the relationship between the recorded user data and the physical disc location identified by the address information is generally predefined. A disc drive that writes data to such recording media records data with reference to this unique address information as described in Japanese Patent Laid-Open Publication No. H11-176081.

DVD and other optical disc media also typically use Reed-Solomon coding or other error correcting code to correct errors caused by disc defects or dust or scratches on the disc surface.

The relationship $$d \geq 2*t+1$$

is generally true in an error correcting code where d is the shortest code distance and t is the number of corrections.

If the location of the error is already known to the error correcting process, erasure correction using information identifying the location of a known error, i.e., a erasure pointer, is possible, and the correction count can be increased a maximum of two times by applying erasure correction.

If the detection correction count is e, then $$d \geq 2*t+e+1$$

is true. For example, code with shortest distance d=33 where all erasures are corrected enables correcting a maximum 32 errors (t=0, e=32).

Erasure correction requires that the locations of the errors are identifiable, and various methods have been proposed for identifying where errors are located.

With optical discs and other recording media using a frame structure to record data, error correcting performance is improved by detecting bit slip from the result of synchronization code detection and identifying where errors have occurred. The frames recorded to such media are formed by segmenting the error correction coded data into multiple data frames of a fixed length, converting the data frames to modulated frame data, and prepending a specific synchronization code to the beginning of the modulated frame data as described in Japanese Patent Laid-Open Publication No. S63-157372 (page 3, FIG. 3).

Other methods combine code with a higher error correction capability for burst error detection and code with a lower error correction rate and low redundancy rather then rely simply on synchronization code detection as described in "Optical Disc System for Digital Video Recording", Narahara Tatsuya and seven others, Part of the Joint International Symposium on Optical Memory and Optical Data Storage 1999, July 1999, No. 3864, p. 50, and "Error Modeling and Performance Analysis of Error-Correcting Codes for the Digital Video Recording System", Narahara Tatsuya and two others, Part of the Joint International Symposium on Optical Memory and Optical Data Storage 1999, July 1999, No. 3864, p. 340, and Japanese Patent Laid-Open Publication No. 2001-515642 (pp. 10-11, FIG. 2). In this case two codewords are formed between synchronization codes, error correction with a high correction rate is combined with synchronization code detection, and erasures are identified for erasure correction of the low error correction rate code.

Methods for improving error correction by locating errors during erasure error correction of the detection result of synchronization code, that is, by generating a erasure pointer, have thus conventionally been used.

A number of problems are left unsolved by the related art described above.

The first problem is that data playback is synchronized to a specific pattern contained in a synchronization code that is recorded with the data, and search (seek) operations depend on reading a data ID. For example, if the synchronization code in the first frame of a particular sector (synchronization code SY0 with DVD media) cannot be identified, the data ID cannot be read, and data seek operations are not stable.

While the location of a particular frame within the sector can be determined if synchronization codes can be read from plural consecutive frames not including the first frame in the sector, synchronization can take a long time or synchronization may not be possible if the data is low quality.

It may also not be possible to identify the type of synchronization code if data quality is low and synchronization is out of step during demodulation and error correction after the data seek is completed and recorded data is read from the addressed location. Furthermore, if synchronization remains out of step for plural frames, it is not possible to recognize frame slipping when it occurs. Even after the synchronization codes can be read again after recovering from this unsynchronized state, synchronization codes must again be read from multiple frames in order to determine the frame location, and the data error rate can increase.

The following problems are also presented by relying on synchronization code detection to generate erasure pointers for erasure error correction.

The first problem is that because the circuit block for synchronization code detection and the circuit block for error correcting using the detection results are different, the results of synchronization code detection synchronized to the demodulated demodulation data must be sent to the error correcting circuit block.

The second problem is that because the timing for generating the detection result of synchronization code and the timing for error correction differ, the detection result of synchronization code must be stored until error correction can be applied. Synchronization code detection also occurs before playback signal demodulation so that frame synchronization can be completed before playback signal demodulation.

The demodulated data is also typically buffered to DRAM or other memory device before error correction, and error correction starts after all frames in the error correcting code block have been stored. The timing for generating the detection result of synchronization code therefore differs from the error correction timing, and detection result of synchronization codes must be stored until error correction is processed.

A first object of the present invention is therefore to assure stable playback performance and reduce data dropout due to out of step synchronization even when playback signal quality deteriorates due to a recording medium defect, for example.

A second object of the invention is to use the demodulated data and the corresponding synchronization detection result information for error correction.

SUMMARY OF THE INVENTION

A playback method according to the present invention for a recording medium to which data is recorded in block units containing multiple fixed-length frames together with block address information comprises steps of: acquiring the data and the block address information from the recording medium; predicting the recording position of each frame in a block from the acquired block address information; synchronizing to the frame level based on the acquired data; determining the memory address for storing the data acquired based on the predicted recording position; and storing the acquired data at the determined memory address.

Preferably, this playback also has steps of: determining whether synchronization at the data frame unit level has been established; and detecting whether synchronization at the frame unit has been restored if frame synchronization goes out-of-step. When recovery of frame synchronization is detected, the memory address to which data is stored is determined based on the predicted frame recording position.

A playback control circuit according to the present invention for a recording medium to which data is recorded in block units containing multiple fixed-length frames together with block address information includes: signal reading means for acquiring the data and the block address information from the recording medium; a recording address predicting means for predicting the recording position of each frame in a block from the acquired block address information; synchronization means for synchronizing to the frame level based on the acquired data; memory for storing the data; and control means for determining the memory address for storing the data based on the predicted recording position.

This playback control circuit preferably also has a synchronization detection means for determining whether synchronization at the data frame unit level has been established, and detecting whether synchronization at the frame unit has been restored if frame synchronization goes out-of-step. The control means determines the memory address to which data is stored in memory based on the recording position predicted by the recording address predicting means when the synchronization detection means detects recovery of frame synchronization.

A playback apparatus for according to the present invention for a recording medium to which data is recorded in block units containing multiple fixed-length frames together with block address information includes the playback control circuit above mentioned.

A further playback method according to the present invention for reproducing data from a recording medium to which is recorded modulated frame data and a specific synchronization code prepended to the beginning of the modulated frame data, the modulated frame data being error correction coded data segmented into multiple frame data blocks of a specific length and then modulated, includes steps of: acquiring signals from the recording medium; acquiring a detection result of synchronization code by detecting frame synchronization codes from the acquired signals; correcting frame synchronization based on the acquired detection result of synchronization code; generating a result information for detection of synchronization code coded according to specific rules from the detection result of synchronization code; demodulating the modulated frame data for each frame and generating demodulated frame data; and adding the result information for detection of synchronization code for each frame to the corresponding demodulated frame data.

This playback method preferably also includes a erasure pointer generating step for generating a erasure pointer for erasure correction based on the demodulated frame data using the corresponding result information for detection of synchronization code; and an error correcting step for erasure correcting error correcting code composed from multiple demodulated frame data blocks using the erasure pointers for the demodulated frame data.

Further preferably, there is a memory step for storing the result information for detection of synchronization code and corresponding demodulated frame data in different memory areas with a known correlation therebetween.

Yet further preferably, the result information for detection of synchronization code is coded to differentiate between at least the three detection results of "normal detection" when the synchronization code is detected normally, "undetected" when the synchronization code is not detected, and "out-of-step synchronization" when a next synchronization code is detected at a timing offset from a timing predicted from the timing of the detection result for the previously detected synchronization code.

Yet further preferably, when the frame synchronization step corrects synchronization delay in which a new synchronization code is detected earlier than the timing predicted from the timing of the detection result of the previously detected synchronization code, and the synchronization delay is less than one frame, the memory step corrects the memory address of the frame data immediately after synchronization delay correction to an address derived by skipping an amount equivalent to the synchronization delay correction, and stores the frame data to the corrected address.

Yet further preferably, when the frame synchronization step corrects synchronization delay in which a new synchronization code is detected earlier than the timing predicted from the timing of the previously detected synchronization code, and the synchronization delay is greater than or equal to one frame, the memory step corrects the memory address of the result information for detection of synchronization code and frame data immediately after synchronization delay correction to an address shifted equivalently to the correction for the synchronization delay, and then stores the data to the corrected address; and the erasure pointer generating step determines that result information for detection of synchronization code that is skipped and not stored to memory was undetected, and generates a erasure pointer thereto.

A further playback control circuit according to the present invention for reproducing data from a recording medium to which is recorded modulated frame data and a specific synchronization code prepended to the beginning of the modulated frame data, the modulated frame data being error correction coded data segmented into multiple frame data blocks of a specific length and then modulated. The playback control circuit includes: a frame synchronization means for correcting frame synchronization based on a detection result of synchronization code acquired by detecting frame synchronization codes from playback signals acquired from the recording medium; a result information for detection of synchronization code generating means for generating result information for detection of synchronization code coded according to specific rules from the detection result of synchronization code; a demodulation means for demodulating the modulated frame data for each frame and generating demodulated frame data; an adding means for prepending result information for detection of synchronization code for a frame to the beginning of the demodulated frame data; memory for storing the result information for detection of synchronization code and demodulated frame data; and memory control means for storing the result information for detection of synchronization code and demodulated frame data to memory.

Further preferably, this playback control circuit also includes: a erasure pointer generating means for generating a erasure pointer for erasure correction using the result information for detection of synchronization code; and an error correcting means for erasure correcting error correcting code composed from demodulated frame data using the erasure pointers.

Yet further preferably, the result information for detection of synchronization code is coded to differentiate between at least the three detection results of "normal detection" when the synchronization code is detected normally, "undetected" when the synchronization code is not detected, and "out-of-step synchronization" when a next synchronization code is detected at a timing offset from a timing predicted from the timing of the detection result for the previously detected synchronization code.

Yet further preferably, when the frame synchronization means corrects synchronization delay in which a new synchronization code is detected earlier than the timing predicted from the timing of the previously detected synchronization code, and the synchronization delay is less than one frame, the memory control means corrects the memory address of the frame data immediately after synchronization delay correction to an address derived by skipping an amount equivalent to the synchronization delay correction, and stores the frame data to the corrected address.

Yet further preferably, when the frame synchronization means corrects synchronization delay in which a new synchronization code is detected earlier than the timing predicted from the timing of the previously detected synchronization code, and the synchronization delay is greater than or equal to one frame, the memory control means corrects the memory address of the result information for detection of synchronization code and frame data immediately after synchronization delay correction to an address shifted equivalently to the correction for synchronization delay, and then stores the frame data to the corrected address; and the erasure pointer generating means determines that result information for detection of synchronization code correspond to a frame that is skipped and not stored to memory was undetected, and generates a erasure pointer thereto.

Yet further a playback apparatus according to the present invention for reproducing data from a recording medium includes the playback control circuit above mentioned.

By providing means for predicting the location of recorded data from address information prerecorded to the recording medium, the playback method and apparatus of the present invention can hold frame synchronization more consistently. Frame synchronization can also be quickly restored even when the signal quality of the recorded data deteriorates temporarily due to a scratch or dust on the recording medium.

Furthermore, by recording demodulated data to buffer memory in frame units, the playback method and apparatus of the present invention can quickly correct the address to which data is stored after recovering from out-of-step synchronization. Loss of demodulated data can therefore be minimized and the effect of error correcting code can be maximized even when the quality of the recorded data deteriorates due to repeated recording or dust or a scratch on the recording medium. The playback method and apparatus of the present invention are therefore extremely effective when applied to a high capacity video disc recorder, for example.

To reproduce data recorded in frames, the present invention transfers result information for detection of synchronization code for the first synchronization code in each frame with the demodulated frame data to the error correcting circuit block, stores this data in different memory areas, and applies erasure correction using these detection results of synchronization codes during error correction. Error correction is thereby improved, and data can be reproduced with high reliability.

Other objects and attainments together with a fuller understanding of the invention will become apparent and appreciated by referring to the following description and claims taken in conjunction with the accompanying drawings.

BRIEF DESCRIPTION OF THE DRAWINGS

The present invention will become readily understood from the following description of preferred embodiments thereof made with reference to the accompanying drawings, in which like parts are designated by like reference numeral, and in which:

FIGS. 15A and 15B show the data structure in a second example of a playback method according to the second embodiment of the invention when the detection result of synchronization code is not detected;

FIG. 18 shows how the result information for detection of synchronization code and the demodulated frame data in FIG. 17 are stored;

FIG. 20 shows how the result information for detection of synchronization code and the demodulated frame data in FIG. 19 are stored;

FIG. 22 shows how the result information for detection of synchronization code and the demodulated frame data in FIG. 21 are stored;

FIG. 26 is a block diagram showing the configuration of a playback circuit in a third embodiment of the invention.

DESCRIPTION OF THE PREFERRED EMBODIMENTS

Preferred embodiments of the present invention are described below with reference to the accompanying figures using an optical disc medium by way of example as the recording medium of the invention.

Embodiment 1

Figure 1:
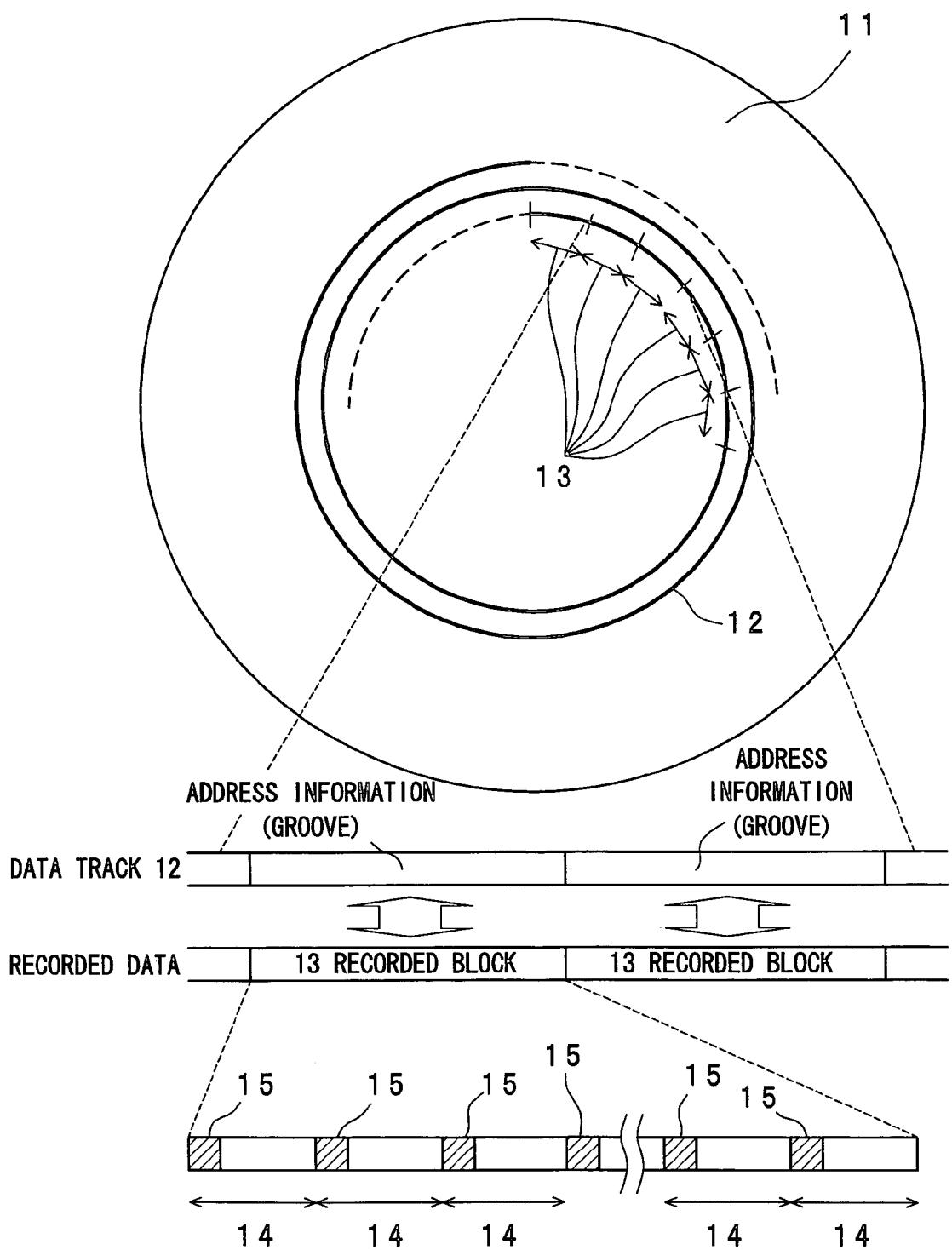
FIG. 1 is a schematic drawing showing the structural configuration of a recording medium according to a first embodiment of the invention.

A playback method, a playback control circuit and a playback drive for a recording medium according to a first embodiment of the present invention are described below. FIG. 1 is a schematic diagram of an optical disc 11 used as the recording medium in this embodiment of the invention. As shown in FIG. 1 a guide groove (called a "groove" below) is formed in a spiral on the recording surface of the optical disc 11. A data track 12 is formed by this groove.

Recorded data is recorded to the data track 12 in recording blocks 13 of plural fixed-length frames. Address information for each recording block 13 is prerecorded in each data track 12 using a wobbled groove or other known change in the groove shape. Though not shown in the figure, a phase-change recording film is formed on the recording surface of the optical disc 11. A local temperature increase caused by the recording device focusing a laser beam spot on the recording film produces a phase change between crystalline and amorphous phases whereby information is recorded.

The address information includes information identifying the location of the recording block 13, which as noted above is the data recording unit. The device reading the optical disc reads the data track 12 to read the address information, and thereby identifies the location of the recording block 13.

Recorded data is recorded in recording block 13 units on the preformed grooves. Each recording block 13 consists of plural fixed-length frames. A synchronization code 15 is located at the beginning of each frame 14.

Figure 8:
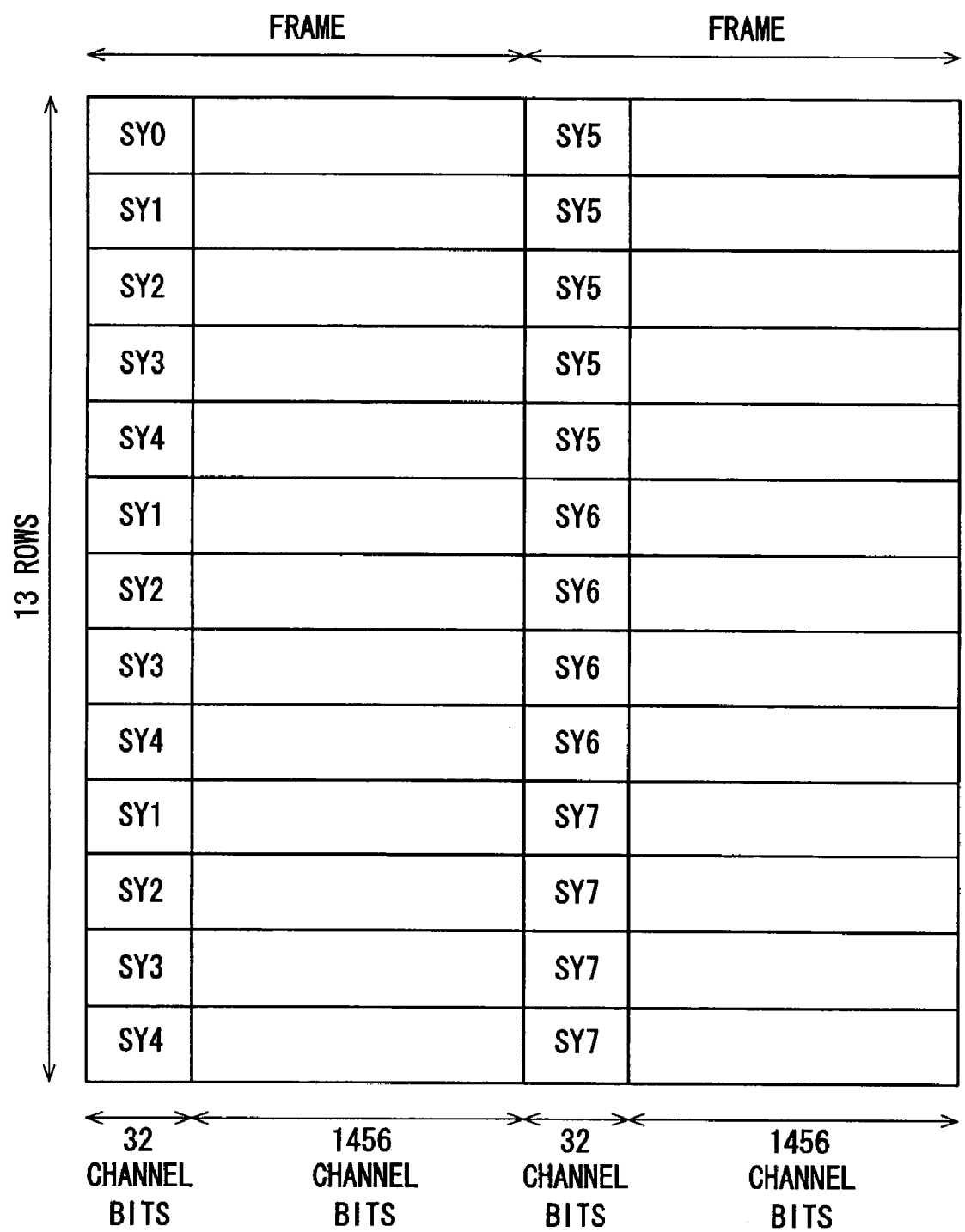
FIG. 8 shows an example of the recording data format of a recording medium according to a first embodiment of the invention.

FIG. 8 shows an example of the recorded data structure in one sector after modulation. One sector contains 26 consecutive frames and a total 2366 bytes with each frame containing 91 data bytes. This total byte count includes 2048 user data bytes, and redundant data such as the data ID and error correcting code parity bytes. Modulation converts 8 binary bits into 16 channel bits, and 91 binary data bytes therefore become a modulated code stream of 1456 channel bits. A synchronization code of 32 channel bits is prepended to the beginning of the modulated code, creating the recording data for one frame. One frame therefore contains 1488 channel bits.

As shown in FIG. 8 one of eight synchronization codes is used according to the location of each frame in the sector. The synchronization codes include a specific (14T+4T) mark/space pattern preceded by a specific pattern identifying the synchronization code type. The synchronization code in frame 1, that is, the first frame in each sector, is called SY0, the synchronization code for frame 2 is SY5, and so forth for frames 3 to 26, assigning a different pattern for signals SY1 to SY7 according to the frame number and whether the frame number is even or odd. It is therefore known, for example, that four frames from the sector start have passed if the synchronization codes for three consecutive frames are {SY5, SY1, SY5}, and that twelve frames from the sector start have passed if the synchronization codes for three consecutive frames are {SY5, SY1, SY6}.

Figure 9:
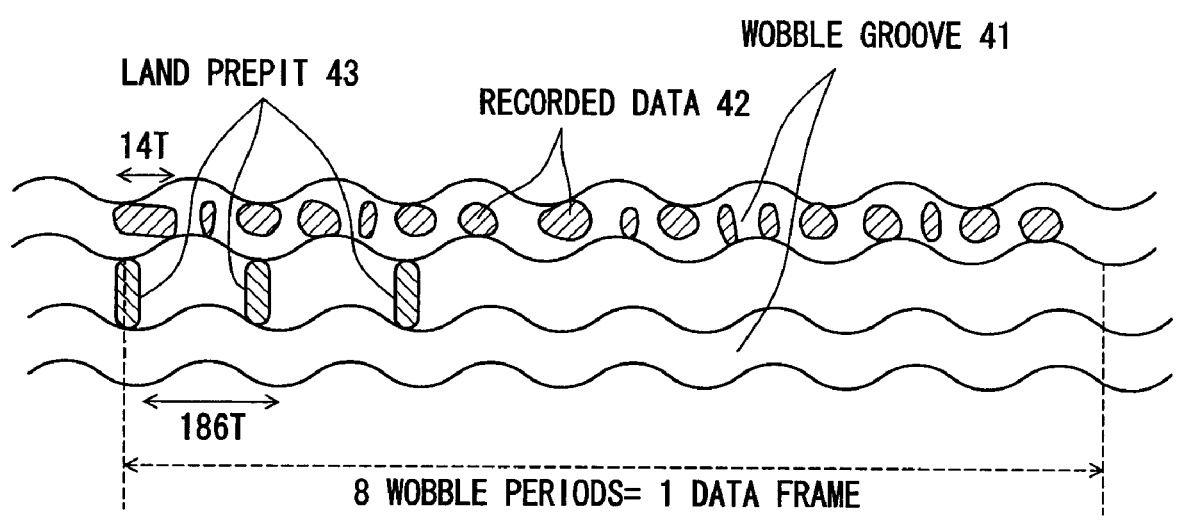
FIG. 9 is a schematic diagram of a method for recording disc address information to a recording medium according to a first embodiment of the invention.

One method of recording address information is shown in FIG. 9. The preformed guide groove is wobbled at a known spatial frequency (a 186 channel bit period in this example), and address information is recorded according to whether a pit is formed or is not formed at a specific period unit (eight wobble periods, equivalent to one frame, in this example) in the land between one wobble groove 41 and the adjacent wobble groove 41. The pits recorded to these lands are called land prepits 43. The address information recorded by these land prepits 43 is called a "prepit address." As shown by the data track 12 and recording blocks 13 in FIG. 1, there is a known correlation between prepit addresses and recording blocks 13. This known correlation means that the location of a recording block 13 is relative to a specified number of prepit addresses, and there is a 1:1 correlation between each recording block 13 and this specified number of prepit addresses. More specifically in this example, two prepit addresses are assigned to one recording block 13, which is the data recording unit, each two consecutive prepit addresses form a prepit address pair, and there is a 1:1 relationship between a prepit address pair and a particular recording block 13.

The relationship between the address information created by these preformed land prepits and data recorded to the phase-change film is described briefly next. When data is recorded the recorder records the synchronization code at the beginning of the data frame either substantially aligned with or at a location having a known physical relationship to the beginning of the land prepit information unit. This enables the playback device to predict where the data is recorded by reading this address information during data playback.

A specific method of predicting the data recording position while reading this address information is described next. There are two periods storing a value meaningful as address information, that is, periods where the prepit address changes, in one ECC block (recording block). The data recording location therefore cannot be predicted with sector or frame unit accuracy by simply reading this address information.

A prediction counter is therefore used to accurately predict where data is recorded. This prediction counter includes frame length counter FLCNT for measuring the length of one frame, frame counter FRCNT for counting the number of frames, and sector counter SCNT for counting the number of sectors. At least the frame length counter FLCNT that measures the length of one frame uses the channel clock extracted from the wobble period in order to reduce prediction counter error.

The frame length counter FLCNT is a loop counter that increments from 0 to 1931 every 11 bits, and then returns to 0. The frame counter FRCNT is also a loop counter, increments from 0 to 25 every 5 bits, and then returns to 0. The sector counter SCNT is also a loop counter, increments from 0 to 15 every 4 bits, and then returns to 0. Each counter can preset the counter value at the read timing of the land prepit address information. This anticipates processing delay by the read circuit, and enables adjusting the count to a value equivalent to the predicted location of the recorded data when the land prepit address information is read. The "predicted location of the recorded data" as used herein denotes the position relative to the start of one ECC block in the form {sector number-frame number-channel bit number}.

After the prediction counter is thus preset in conjunction with reading the address information, the loop counters can be used to predict where the data is recorded. Furthermore, the data location can be accurately predicted insofar as the light beam remains on track and phase synchronization between the wobble and the channel clock extracted from the wobble is not completely lost.

Advantages of predicting the data recording location from address information recorded with a preformed groove pattern are described next. The period of the wobble groove or address information carrier is generally at least approximately ten times the average T (average mark/space length) of the modulated code stream, and at least two times the maximum T (maximum mark/space length). This is to avoid frequency interference between the recorded data and wobble pattern, and resulting degradation of playback signal quality. Because the wobble frequency is below the frequency band of the recorded data, less wobble data is lost than recorded data when the recording surface of the disc is scratched, for example. A PLL based on phase comparison at the wobble edge is therefore more resistant to disc defects, scratches, and dust than a PLL based on phase comparison at the recorded data edge. In other words, a clock signal derived from the wobble signal is notably more stable than a clock signal derived from the recorded data.

Figure 2:
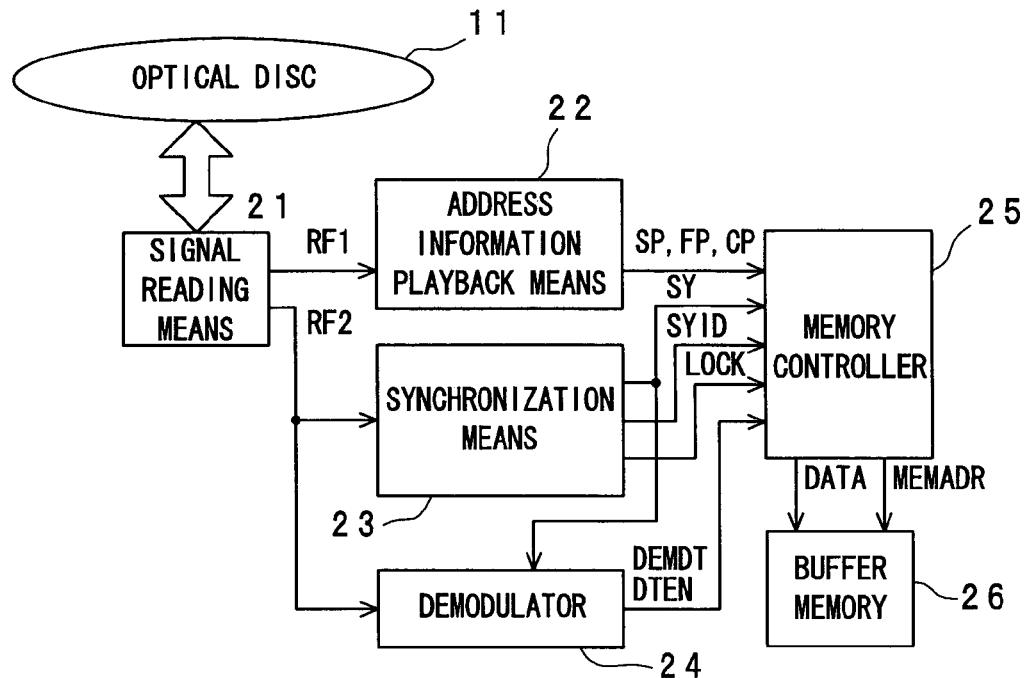
FIG. 2 is a block diagram showing a playback device according to a first embodiment of the invention.

FIG. 2 is a block diagram showing the configuration of a playback device according to a first embodiment of the invention. Operation of this playback device is described next.

The signal reading means 21 first emits a light beam to the optical disc 11, and reads a signal from the beam reflection. The signal reading means 21 extracts signal RF1 reproducing a signal in the tracking direction using a known push-pull method in order to read the wobble and land prepit signal described above, and signal RF2 reproducing the change in reflectivity as a signal in order to read the recorded data.

Signal RF1 is sent to the address information playback means 22, which extracts the wobble signal component and acquires the channel clock using a phase-locked loop (PLL) or other technique. The address information playback means 22 also extracts the land prepit signal component from signal RF1, and reproduces and decodes the address information from the land prepit signal. The prediction counter not shown begins operating and outputs a counter value representing the predicted location of the recorded data after a phase-locked channel clock is derived from an internal wobble signal PLL (not shown in the figure) and the address information is correctly decoded from the land prepit signal. The value of the output counter preferably always contains the sector count SP, frame count FP, and channel count CP.

Signal RF2 is sent to the synchronization means 23, which extracts the signal component of the recorded data and derives the channel clock and channel data using a phase-locked loop (PLL) or other technique. The synchronization means 23 also detects the specific pattern (14T+4T in this example) of the synchronization code from the channel data, and outputs synchronization code SY. To improve the reliability of detecting this specific pattern, this synchronization code SY is preferably output after detecting plural consecutive frames as needed. The synchronization means 23 also preferably has internal means for measuring the synchronization code detection interval, and means for generating a synchronization code detection prediction window. This makes it possible to prevent outputting a pseudo synchronization code SY at the wrong detection interval, and to internally interpolate the synchronization code SY from the previously detected signal when a synchronization code is not detected when expected.

One method of interpolating and outputting the synchronization code SY when the synchronization code is not actually detected is based on the synchronization clock of the playback PLL. This method relies on a counter for counting the channel clock (1488 channel bits in this example) equivalent to the length of one frame from the point at which the previous synchronization code was detected, and interpolates the synchronization code SY using the output of this counter. This counter can also be used as the above-noted means for measuring the synchronization code detection interval or the means for generating the prediction window.

In addition to detecting a specific pattern from the synchronization code, the synchronization means 23 also detects the synchronization code type and outputs synchronization code type signal SYID. With the recorded data format shown in FIG. 8, for example, there are eight synchronization code types SY0 to SY7. The synchronization means 23 therefore also outputs synchronization code type signal SYID=0 to 7 according to the detected signal type SY0 to SY7, and outputs SYID=8 if a playback error in the synchronization code prevents identifying the signal type.

The synchronization means 23 also outputs synchronization state signal LOCK according to the frame synchronization detection state. In this example synchronization state signal LOCK=1 when frame synchronization is normal, and LOCK=0 when there is a problem with frame synchronization, such as when frame synchronization is out of step. More specifically, LOCK=0 when the synchronization code is not detected for a specified number of consecutive frames.

The synchronization code SY is output to demodulator 24, which uses it as the timing signal for starting to demodulate the channel data to binary data. The demodulator 24 then sends the demodulated data DEMDT and data strobe signal DTEN to memory controller 25. The data strobe signal DTEN is used for the demodulated data DEMDT update timing.

The memory controller 25 works to correctly store the demodulated data DEMDT to buffer memory 26. The memory controller 25 receives the synchronization code SY, synchronization code type signal SYID, and synchronization state signal LOCK from synchronization means 23, and the predicted recorded data location (sector count SP and frame count FP) from address information playback means 22, and uses these signals to control where the demodulated data DEMDT is stored.

The buffer memory 26 specifies where the data is stored (the byte location for reading or writing) using memory address MADR, and the memory controller 25 controls where demodulated data DEMDT is stored by controlling buffer memory 26 address MADR.

Figure 3:
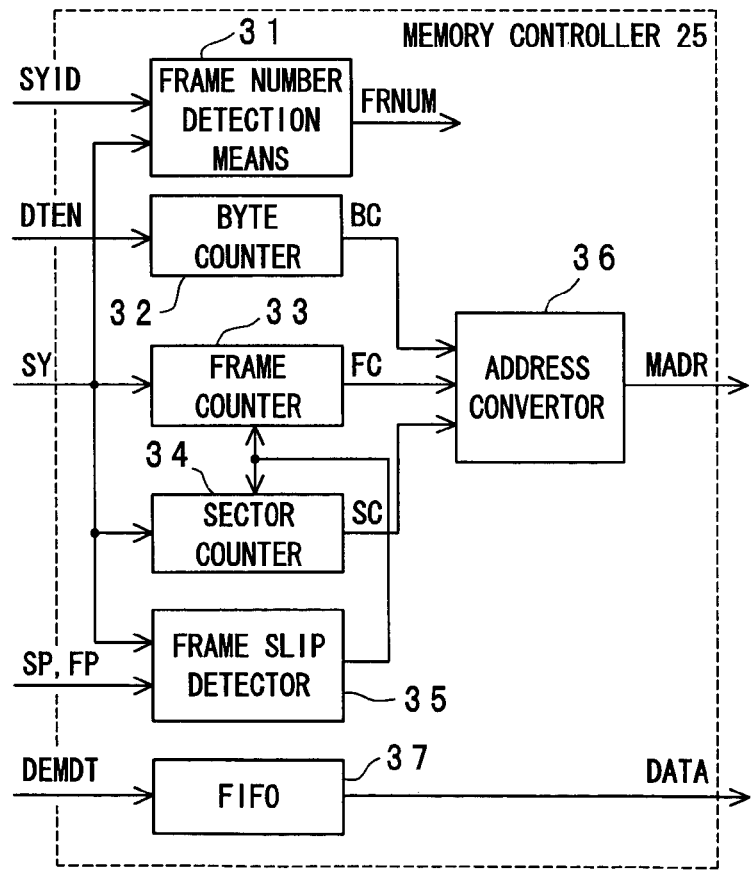
FIG. 3 is a block diagram showing the internal structure of a memory controller 25.

FIG. 3 is a block diagram showing the internal configuration of the memory controller 25. The frame number detection means 31 detects the number of the frame from the beginning of the sector based on the synchronization code SY and synchronization code type signal SYID from synchronization means 23. More specifically, it gets the synchronization code type signal SYID at the synchronization code SY timing, and outputs the frame number FRNUM identified from multiple previous frames based on the synchronization code type SYID. Referring to the recorded data format shown in FIG. 8, for example, FRNUM is a value from 0 to 25 corresponding to the number of frames from the beginning of the sector such that FRNUM=3 if the synchronization code type signals SYID for the three previous frames were {SY5, SY1, SY5}, and FRNUM=11 if the signals were {SY5, SY1, SY6}. If the synchronization code type signal SYID=8 (i.e., unknown type) or the combination of SYID values does not identify any particular frame, then FRNUM=26 denoting an unknown frame number.

The byte counter 32 counts the number of bytes in each frame. The byte counter 32 clears byte count BC (=0) at the synchronization code SY from synchronization means 23, and increments the byte count BC one each time the demodulator 24 outputs data strobe signal DTEN=1. The byte counter 32 continues counting until BC=91, at which time it clears byte count BC to 0 at the next synchronization code SY.

The frame counter 33 counts the number of frames in one sector. When the beginning of a sector is detected, such as when frame number detection means 31 outputs frame number FRNUM=0, frame counter 33 clears frame count FC to 0, increments frame count FC one at the synchronization code SY from synchronization means 23, and resets frame count FC to 0 at the next synchronization code SY when FC=25. The frame slip detector 35 can also control correcting frame count FC to a specific value. The frame count FC counts a clock based on the previously detected synchronization code SY, and increments when the next synchronization code SY is detected. If the next synchronization code SY is not detected, counting continues and the frame count FC is incremented using the original clock.

The sector counter 34 counts the number of sectors in one ECC block. The sector counter 34 clears the sector count SC to 0 at the start of an ECC block, increments sector count SC one simultaneously to frame counter 33 resetting frame count FC from 25 to 0, and clears the sector count SC to 0 at the next synchronization code SY when SC=15 and FC=25. The sector count SC can also be corrected to a specified value based on output from the frame slip detector 35. The sector count SC counts a clock based on the previously detected synchronization code SY, and increments when a specific number of synchronization codes SY has been detected. If the synchronization code SY is not detected, counting continues according to the original clock and sector count SC increments at a predetermined time.

The frame slip detector 35 monitors change in the synchronization state signal LOCK, detects recovery from out-of-step synchronization, and looks for frame slip by comparing predicted recorded data location values SP and FP, sector count SC, and frame count FC.

It should be noted that the synchronization code SY is interpolated and output based on the channel clock synchronized to the playback PLL when the synchronization code is not detected, and the byte counter 32, frame counter 33, and sector counter 34 therefore operate as described above whether the synchronization code is detected or not detected.

The address convertor 36 converts the byte count BC, frame count FC, and sector count SC to a memory address MADR specifying a memory address in buffer memory 26.

FIFO 37 is a first-in first-out memory device for holding a specified time and then outputting the demodulated data DEMDT. FIFO 37 delays output of demodulated data DEMDT this specified time due to the delay required for the address convertor 36 to process and output memory address MADR, and then outputs demodulated data DEMDT as storing data DATA. The memory address MADR and storing data DATA are therefore output at the same time to buffer memory 26 and the demodulated data can be stored to the correct memory address.

Figure 4:
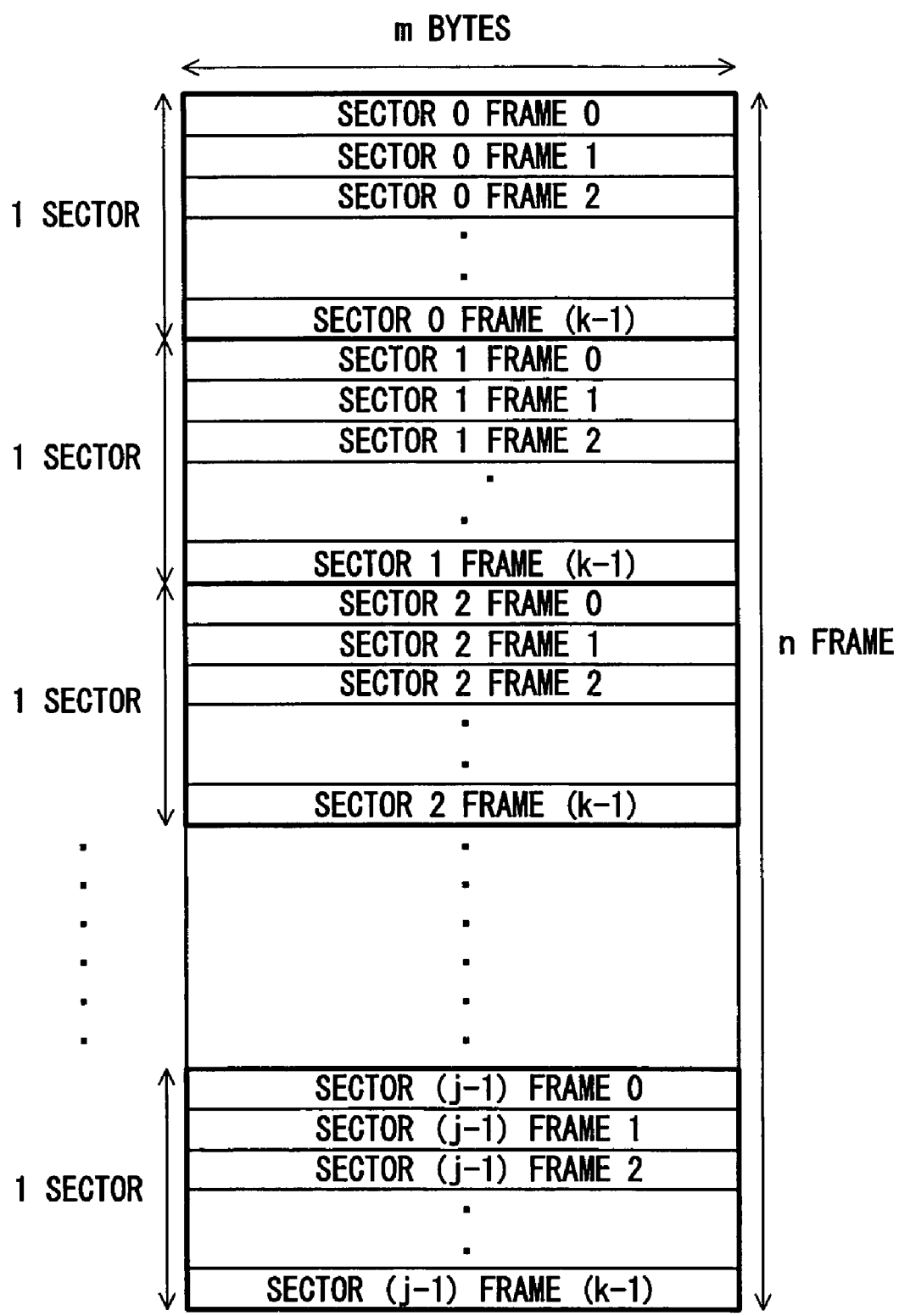
FIG. 4 is a schematic drawing of the memory map for buffer memory 26 in a first embodiment of the invention.

FIG. 4 shows an example of a memory map for buffer memory 26 according to the present embodiment. The number of bytes that can store user data in one frame is indicated in the horizontal direction and denoted as m bytes. The number of frames in one ECC block is denoted by the number of rows in the vertical direction, and is shown as n frames. To achieve the recording data format shown in FIG. 8, m=91 and n=416. The data from one ECC block can be stored by frame unit in the demodulation order by managing buffer memory 26 using a memory map such as shown in FIG. 4.

When storing the demodulated data from a target ECC block to buffer memory 26, the target ECC block is found by decoding the data ID in the recorded data, and the data is then stored sequentially from the beginning to buffer memory 26. The beginning of an ECC block is found by detecting the synchronization code type and decoding the data ID, and the first memory address for the demodulated data in each frame is controlled with synchronization code SY.

What happens when playback signal quality for the recorded data temporarily deteriorates and synchronization code detection and data ID decoding are not possible for several frames or an entire sector is considered next. In this case the internal playback PLL of the synchronization means 23 may be out-of-step. Whether the PLL is out-of-step cannot be easily determined when consecutive synchronization codes cannot be detected because the recorded data contains signals of various mark and space lengths in the modulated code stream.

On the other hand, because the period of the wobble signal derived from signal RF1 is sufficiently longer than the period of the recorded signal derived from signal RF2, the internal wobble signal PLL of the address information playback means 22 is more stable than the playback PLL when the signal is degraded by, for example, scratches or dust on the disc. Synchronization is therefore unlikely to become out-of-step in these cases. Furthermore, even if synchronization is out-of-step, if the wobble signal is derived as a signal with a specific frequency near the period of the carrier, a phase comparison of the wobble signal and PLL clock can easily determine if the wobble signal PLL is out-of-step.

The playback device can therefore determine which frame (frame number) in the current ECC block is to be demodulated from the location of the recorded data predicted by the address information playback means 22 insofar as the wobble signal PLL, which is more stable than the playback signal PLL, is in phase even if synchronization code detection is not possible because of degraded signal quality.

For example, if demodulated data in a particular ECC block is to be stored to buffer memory 26, the address information playback means 22 can determine the memory address nx (where 0<=nx<=415) in the buffer memory that will store the data as $$nx = SPx * FPx$$

where predicted sector position SPx is an integer in the range 0<=SPx<=15, and predicted frame position FPx is an integer in the range 0<=FPx<=25.

The location of recorded data in an ECC block can therefore be predicted in real time using the reproduced address information and synchronization clock from the wobble signal PLL.

Furthermore, the memory address of the demodulated data in the buffer memory can be controlled at the frame unit level by using the predicted position of the recorded data. Demodulated data can therefore be appropriately stored to the buffer memory even if consecutive synchronization codes cannot be detected from the recorded data.

When a frame is dropped due to degraded signal quality in the recorded data, storing controlling data to the buffer memory is described next.

In the first example considered below the playback signal PLL goes out-of-step in the low frequency direction, the synchronization code continues undetected for the time equivalent of seven frames, and there is a frame slip (loss) of one frame.

Figure 5:
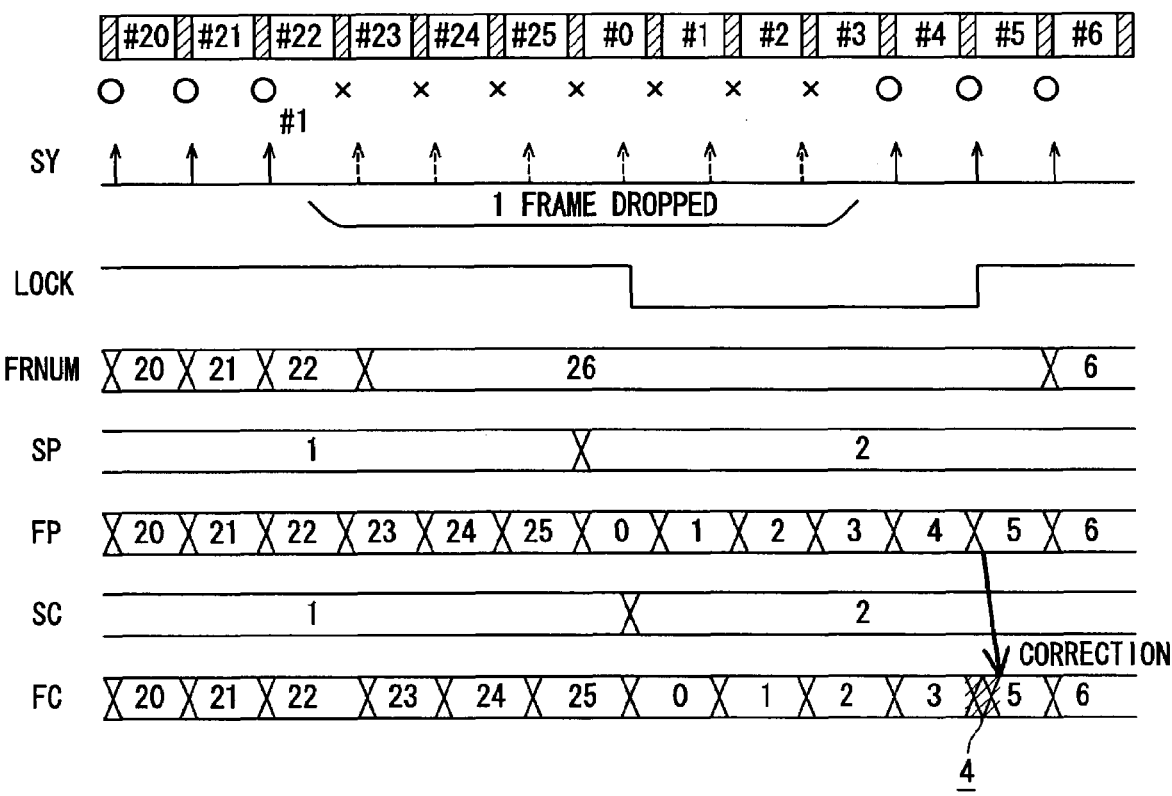
FIG. 5 is a timing chart showing an example of internal signal change when a frame is dropped in a first embodiment of the invention.

FIG. 5 is a timing chart illustrating the loss of one frame due to frame slip. When the playback PLL goes out-of-step, pattern detection does not occur when the synchronization code should normally be detected as shown in the figure. The synchronization code is therefore interpolated based on the PLL synchronization clock, and the interpolated synchronization code SY is output in the time-delay direction. The synchronization code type signal SYID is therefore set to 8 (unknown type) and the frame number FRNUM is set to buffer memory 26 (unknown frame number).

In the example shown in FIG. 8, when synchronization state signal LOCK =1 (normal synchronization) and the synchronization code is then undetected for four consecutive frames or more, synchronization is known to be out-of-step and LOCK therefore goes to 0 (out-of-step synchronization). If when synchronization state signal LOCK=0 the synchronization code is then detected from two consecutive frames, LOCK again goes to 1, denoting normal synchronization.

Furthermore, when synchronization state signal LOCK changes from 0 to 1 (i.e., when synchronization is recovered), recording position prediction signals SP and FP, sector count SC, and frame count FC are compared, and if (SP=SC and FP=FC), it is assumed that only a frame slip has occurred, and the memory address in the frame data buffer memory 206 is shifted one frame unit.

More specifically in this example, when LOCK goes from 0 to 1, SP=2, FP=5, SC=2, and FC=4, the value of frame count FC is one less than the recording position prediction signal FP, and it is known that one frame was dropped while synchronization was out of step. The frame count FC is therefore corrected from the current value of 4 to 5. As a result, the memory address MADR output by address convertor 36 can be automatically changed to point to the correct memory address. It is therefore possible to immediately store data to the correct memory address when synchronization is restored.

It should be noted that while the recording position prediction signals and counter values indicating the buffer memory address are compared at the frame unit level in this embodiment, comparison at the byte unit level is also possible. However, because the correlation between these can vary somewhat due to variation in the recording position by the recording device and PLL jitter in the playback device, it is preferable to use as the unit of comparison a unit that potentially produces less error considering the potential for this variation.

In the next example below the playback signal PLL goes out-of-step in the high frequency direction, the synchronization code continues undetected for the time equivalent of ten frames, and there is a frame slip (misinsertion) of two frames.

Figure 6:
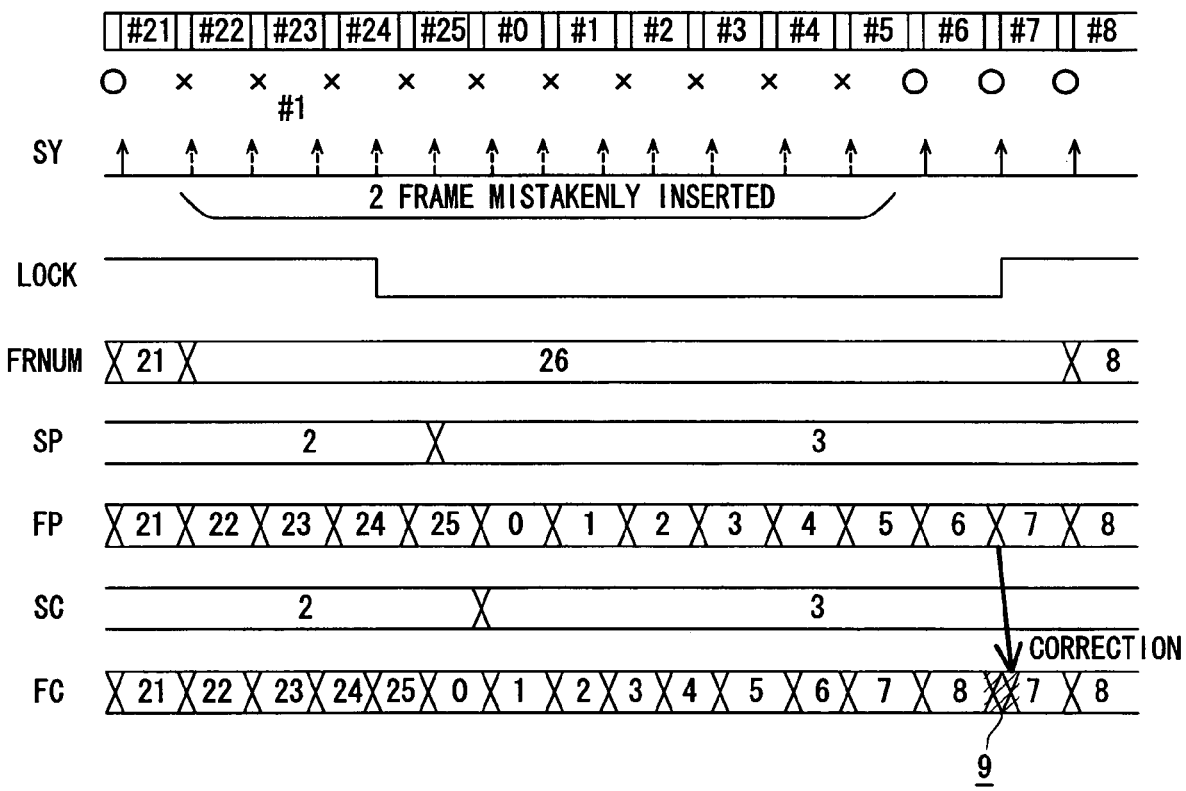
FIG. 6 is a timing chart showing an example of internal signal change when a frame is inserted in a first embodiment of the invention.

FIG. 6 is a timing chart showing insertion of two frames. As shown in the figure, the playback PLL goes out of sync, pattern detection does not occur when the synchronization code should normally be detected, the synchronization code is interpolated based on the PLL synchronization clock, and the interpolated synchronization code SY is output in the time-advanced direction.

The state change in the synchronization state signal LOCK is the same as shown in FIG. 5 in this example. When the synchronization state signal LOCK goes from 0 to 1, i.e., when synchronization is restored from an out-of-step state, the recording position prediction signals are SP=3 and FP=7, sector count SC=3 and frame count FC=9, data is erroneously inserted while synchronization is out-of-step, and it is known that two extra frames have been stored to the buffer memory. The frame count FC is therefore corrected from the current value of FC=9 to FC=7. The memory address MADR output from address convertor 36 can therefore be automatically changed to point to the correct memory address. It is therefore possible to immediately store data to the correct memory address when synchronization is restored.

Figure 7:
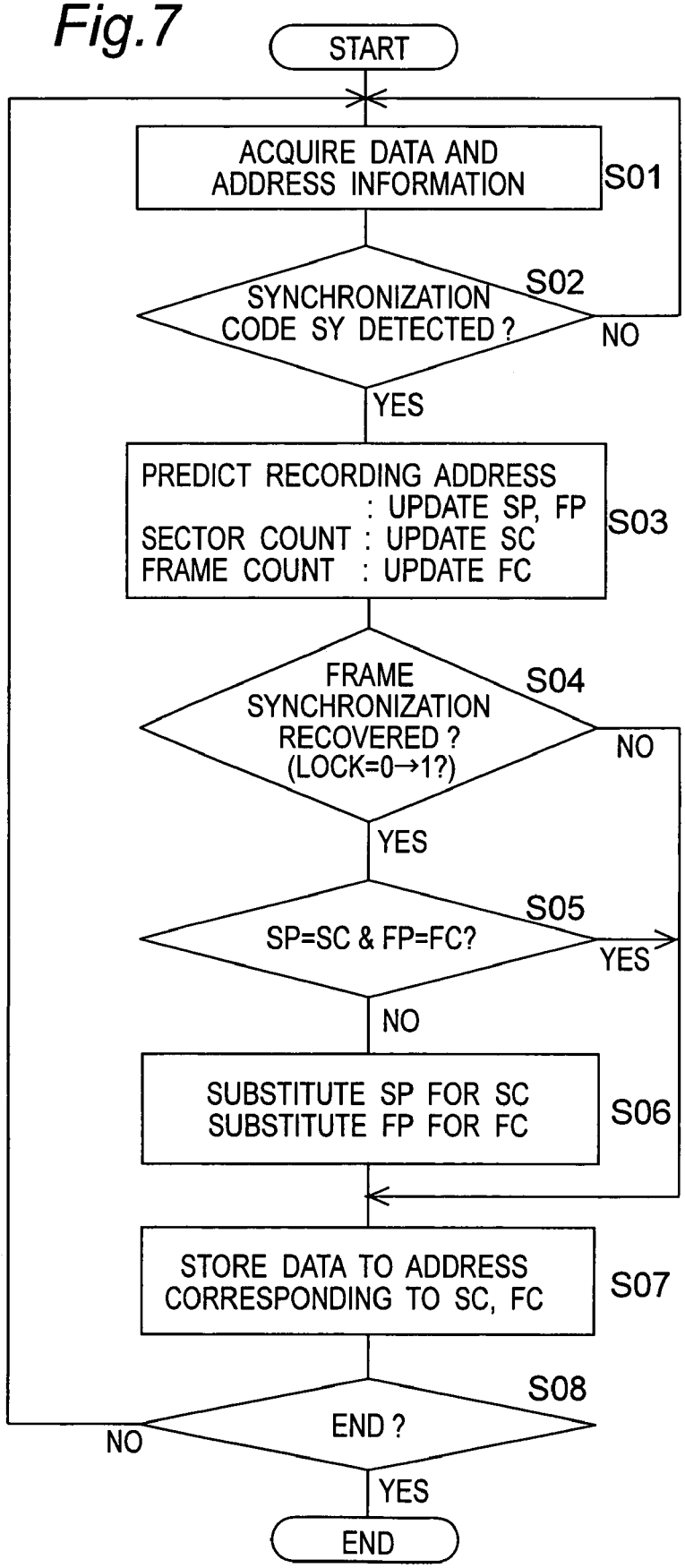
FIG. 7 is a flow chart of buffer memory storing control when frames slip in a first embodiment of the invention.

FIG. 7 is a flow chart of the process shown in the timing charts in FIG. 5 and FIG. 6 from the perspective of buffer memory storing control by the memory controller 25. The flow chart shown in FIG. 7 is described next below.

(a) Data playback of the target ECC block starts, and synchronization state signal LOCK denoting an out-of-step state is set to normal synchronization (LOCK=1).

(b) The data and block address information is acquired (S01).

(c) Whether the synchronization code SY was detected or not is then determined (S02). If the synchronization code SY was not detected, control loops back to step S01 to acquire data for the next frame. If the synchronization code SY is not detected, LOCK=0 because synchronization is determined to be out-of-step, and synchronization code SY is interpolated and output based on the synchronization code detected immediately before. If the synchronization code SY was detected, LOCK=1 because synchronization is normal.

(d) The sector count SP predicting the recording position of each sector in the block from the address information, and the frame count FP predicting the recording position of each frame in the sector, are then updated. The sector count SC and frame count FC are then updated based on the detected or interpolated synchronization code SY (S03).

(e) Recovery of frame synchronization, or more specifically a change in the synchronization state signal LOCK from 0 to 1, is then detected (S04). If there is a change from an out-of-step state (LOCK=0) to a normal synchronization state (LOCK=1), synchronization is restored and S04 returns yes. If LOCK=1 remains true because normal synchronization continues (i.e., synchronization was not lost), S04 returns no.

(f) The recording position prediction signals SP and FP, sector count SC, and frame count FC are then compared (S05). If the values match, frame slip has not occurred, and S05 returns yes.

(g) However, if there is a mismatch between any of these values, a frame slip has occurred. The value of the sector position prediction signal SP is therefore substituted for sector count SC, and the value of the frame position prediction signal FP is substituted for frame count FC (S06).

(h) Data is then recorded to the memory address corresponding to these SC and FC values.

(i) Whether operation is completed is then determined (S08). If operation continues, the process loops back to the data and address information acquisition step (S01). If operation ends, the termination process executes.

The process described with reference to the flow chart in FIG. 7 can quickly correct the buffer memory address as soon as synchronization recovers from a frame slip whenever a frame slip occurs.

More specifically, when compared with methods that use only information reproduced from the recorded data, the recording address can be corrected more quickly and reliably by predicting the recording address using data separate from the data signal reproduced from the recorded data, i.e., information acquired from the wobble groove and land prepits, and detecting and correcting for frame slip.

Furthermore, data loss caused by frame slip can be minimized without complicating buffer memory management because the buffer memory unit can be corrected at the data frame level.

It will thus be apparent from the preceding description that a method and apparatus according to this embodiment of the invention can consistently predict the location of recorded data from a preformed wobble groove and land prepits.

Furthermore, when frame slip results from the playback PLL going out-of-step and synchronization is then restored, the method and apparatus of this embodiment can also determine whether frame slip has occurred by comparing the predicted location of the recorded data with the address where the demodulated data is stored to buffer memory.

Yet further, when the buffer memory address shifts due to frame slip, the method and apparatus of this embodiment can also use the predicted location of the recorded data to assure that subsequent demodulated data is stored to the correct address.

In the above-described embodiment of the invention frame slip detection and buffer memory address correction are accomplished using recording address prediction signals. The invention shall not be so limited, however, and a method that also looks at the data ID of the recorded data and the synchronization code type (and whether the type matches) could additionally be used. Additionally using a method that looks at the data ID of the recorded data and the synchronization code type (and whether the type matches) is particularly effective when, for example, the wobble signal PLL is out-of-step before or after frame slip occurs, and when it is difficult to predict the address of the recorded data due to the poor quality of the land prepits.

An optical disc is also used by way of example as the recording medium in the present embodiment of the invention, but the invention shall not be so limited. More specifically, the object of the invention can be achieved using any recording medium that, similarly to the wobble groove and land prepits of the above-described embodiment, has both a channel for recording user data and another separate channel on the same recording medium such that a reading device can read both channels substantially simultaneously, and can predict where data is stored in the user data recording channel based on information read from the other channel because there is a known correlation between the information acquired from the other separate channel and where user data is recorded on the user data recording channel.

Yet further, this other separate channel is preferably more robust, meaning it is more resistant to errors resulting from scratches, dust, or defects in the recording medium, than the user data recording channel.

The buffer memory map described above is also simply based on frame units, but the invention shall not be so limited. In practice, data will be stored appropriately to the encoding/decoding processes of the disc drive as determined by the error correcting code (product code, interleaved, or other). For example, the correction process can be made more efficient by dividing memory space into parts equivalent to the data bytes and parity bytes in the error correcting code. The process can also be accelerated by deinterleaving the demodulated data while storing it to buffer memory. In any case, this can be handled by modifying the internal configuration of the means for converting the memory address applied to the buffer memory, and differences relating to the specifics of the buffer memory map have no direct effect on the substance of the present invention.

Embodiment 2

A playback method according to a second embodiment of the invention is described next. FIG. 10A to FIG. 10C show the frame data format in this second embodiment. FIG. 10A shows the format of the sector error correcting code, each error correcting code 101 adding 16 bytes of parity data 103 to each 128 bytes of user data 102. One sector contains eight error correcting code 101 blocks. The error correcting code 101 is coded in the column direction and recorded in the row direction, thus interleaving the code so as to improve the ability to correct burst errors.

The error correcting code 101 is coded using a known Reed-Solomon coding method. The 16-byte parity data 103 has an error correcting capacity of up to 8 bytes. By erasure correction, error correcting of up to 16 bytes is possible. Eight error correcting code 101 blocks produce a 1 KB sector, and the sector is the smallest unit used for reading and writing.

FIG. 10B shows the frame data format dividing the above error correcting code into rows. The eight error correcting code 101 blocks in one sector are thus interleaved and split into frame data 104 of 8 bytes per frame.

FIG. 10C shows the frame structure in which frame data 104 is stored as modulated frame data 105. A synchronization code 106 is prepended to each modulated frame data 105 block. The modulation method used here is the same (8,16) modulation used with DVD media, i.e., 8 bits are converted to 16 bits and an 8-byte frame data 104 block is converted to (8*16=) 128 bits of modulated frame data 105. The synchronization code 106 is 32 bits long and comprises a known specific pattern that never appears in (8,16) modulated code, and a frame number. One frame thus comprises (32+128=) 160 bits, and one sector comprises a total 144 frames.

It will be obvious that the synchronization code shall not be limited to this configuration. Multiple specific patterns could be used to write a different synchronization code in each frame, and the sequence of these specific patterns could be detected from the synchronization codes in multiple frames to determine the number of each frame.

This frame structure is commonly used in optical disc media so that synchronization can be corrected when bit slip occurs due to a disc defect or scratch, for example, by detecting the first synchronization code in each frame and resynchronizing.

Figure 10:
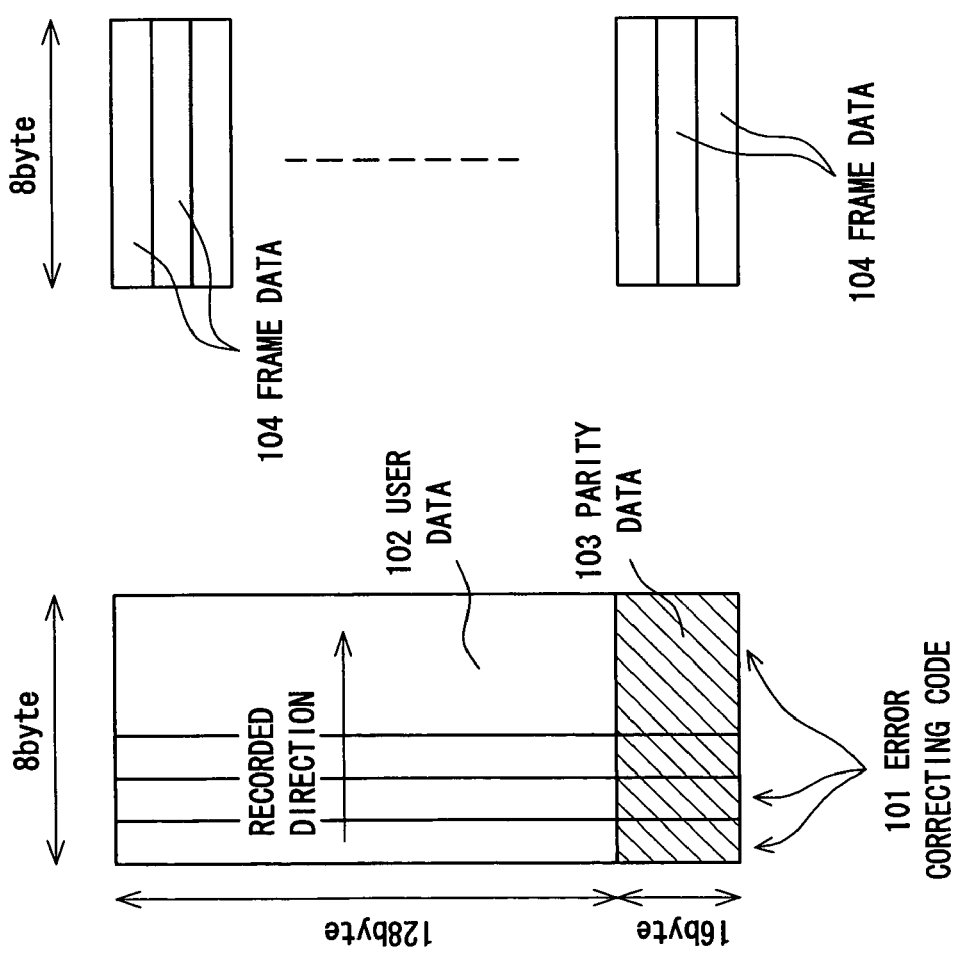
FIGS. 10A to 10C are schematic diagrams of the frame data structure in a second embodiment of the invention.
Figure 11:
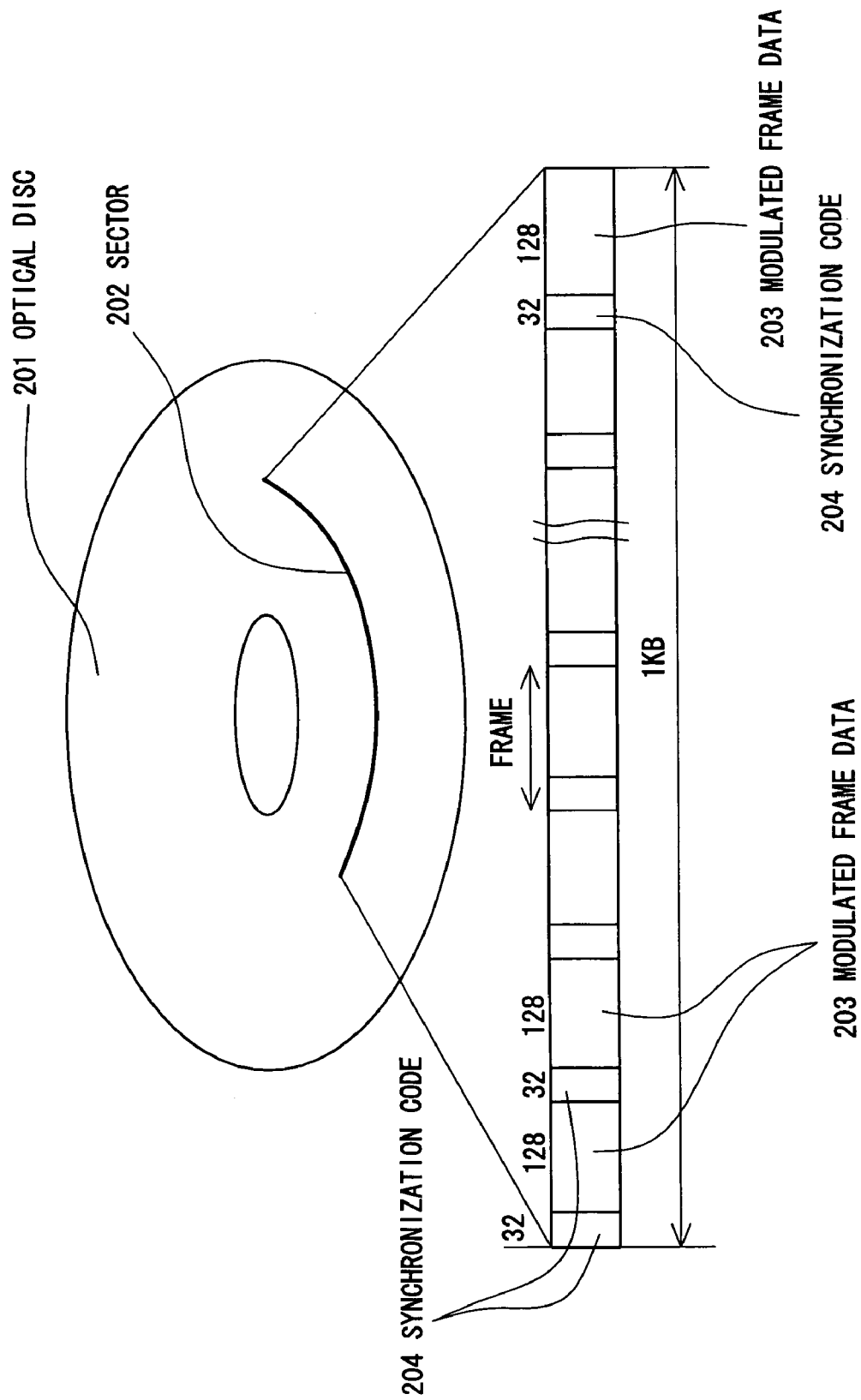
FIG. 11 is a schematic diagram of the optical disc format in a second embodiment of the invention.

FIG. 11 shows the format of an optical disc and how a sector shown in FIG. 10 is recorded to the optical disc 201. As shown in FIG. 11, each sector 202, which is the smallest recording/playback unit, is recorded to the optical disc 201 divided into 144 frames, each frame comprising a 32-bit synchronization code 204 and 128-bit modulated frame data 203.

Figure 12:
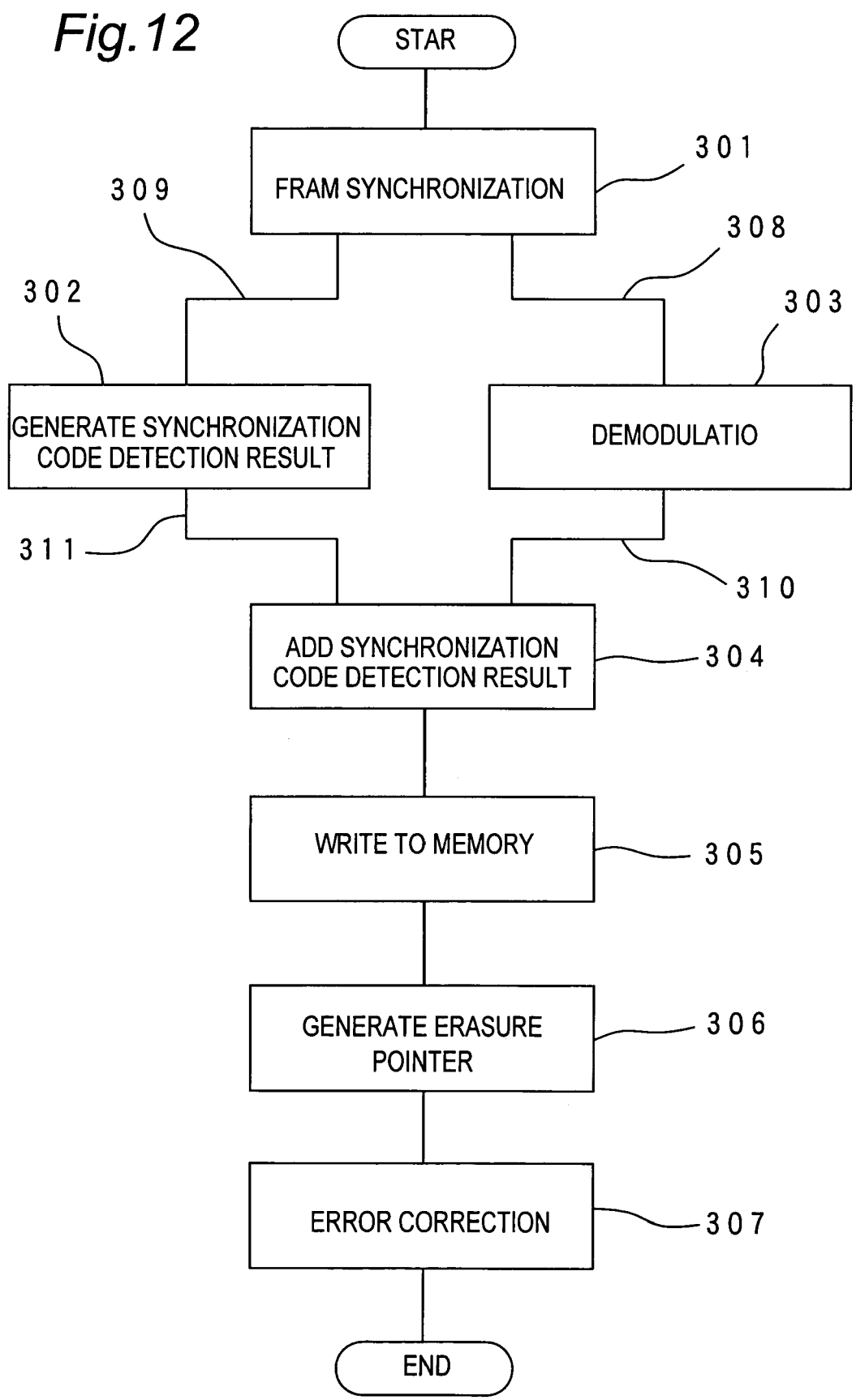
FIG. 12 is a flow chart of the playback method in a second embodiment of the invention.

FIG. 12 is a flow chart of the playback method of this second embodiment of the invention used to read an optical disc recorded as shown in FIG. 10 and FIG. 11. This playback method is described next with reference to FIG. 12.

(a) The synchronization code is first detected from the playback signal read from the disc for frame synchronization (frame synchronization step 301). Because the synchronization code is recorded using a specific pattern, the synchronization code can be detected by detecting a match with the playback signal.

Frame synchronization as used here means that the number of each frame and the beginning of each frame, and the beginning of each modulated frame data block, are identified from the playback signal.

(b) Result information for detection of synchronization code 311 denoting the detection result of synchronization code is created for each modulated frame data block (result information for detection of synchronization code generating step 302). There are three detection result of synchronization codes, normal detection, out-of-step detection, not detected, which are encoded in the result information for detection of synchronization code 311 as the two-bit values 00, 10, and 01, respectively.

i) Normal Detection

The number of bits from the synchronization code in the previously detected frame is also counted during synchronization code detection. Because one frame is 160 bits long, the synchronization code for the next frame should be detected precisely 160 bits after the previous synchronization code. If it is so detected, detection result of synchronization code 309 is set to normal because synchronization is not out-of-step from one frame to the next.

ii) Out-of-step Detection

If the synchronization code is detected at a time other than 160 bits after the beginning of the previous frame, frame synchronization is corrected to resynchronize based on the newly detected synchronization code. As a result of this frame synchronization, the demodulation process described below is applied to the 128-bit modulated frame data 308 based on the identified frame start position. The detection result of synchronization code 309 is set to out-of-step detection. Note that out-of-step synchronization could be either advanced or delayed synchronization.

iii) Undetected

If the synchronization code is not detected, the current synchronization phase is held and detection result of synchronization code 309 is set to undetected.

As further described below the result information for detection of synchronization code 311 is 8 bits (one byte), and the remaining six bits are used to substantially identify the frame number. The bit length and coding method of the result information for detection of synchronization code 311 shall not be limited to the above. The bit length could, for example, be increased so that the frame number can be completely identified.

(c) The 128-bit modulated frame data 308 is then demodulated based on the frame start position identified as a result of frame synchronization. This demodulation step 303 demodulates the modulated frame data, and thus outputs demodulated frame data 310.

(d) The result information for detection of synchronization code 311 is prepended to the beginning of each demodulated frame data block and sent to the error correcting circuit block (adding step 304 for adding the detection result of synchronization code).

(e) The transferred demodulated frame data and result information for detection of synchronization code 311 are stored in separate areas in DRAM or other memory device (memory step 305).

(f) To execute erasure correction, a erasure pointer identifying the error location is generated from the result information for detection of synchronization code 311 stored to memory (erasure pointer generating step 306). The erasure pointer is generated using only the result information for detection of synchronization code 311 in this example, but a means for predicting the locations of other errors could also be used.

(g) The erasure pointer is then used for erasure correction in the error correction step 307. Error correction capacity is increased at most twice by applying erasure correction.

The demodulated frame data stored to memory can then be read from memory and the correct data can be reproduced because error correcting has already been applied.

The steps from the frame synchronization step 301 to the memory step 305 are described in detail next below with reference to FIG. 13 to FIG. 24.

EXAMPLE 1

Figure 13A:
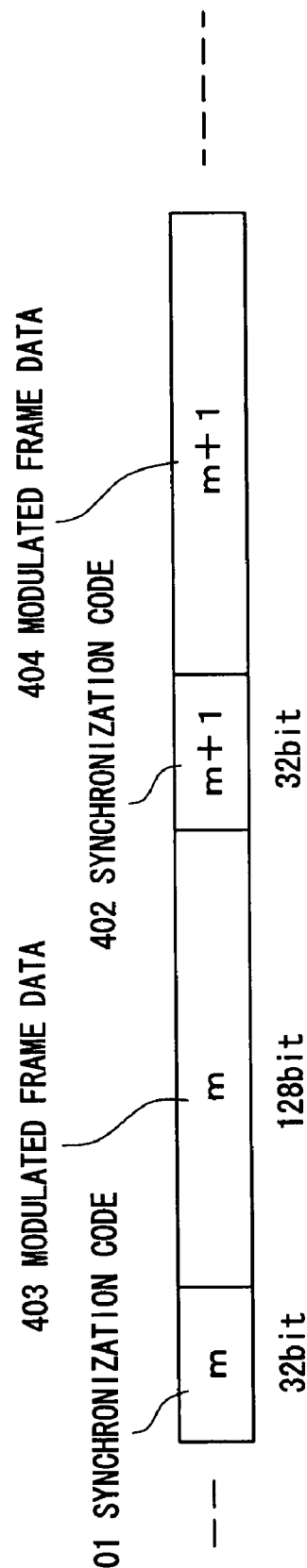
FIGS. 13A and 13B show the data structure in a first example of a playback method according to the second embodiment of the invention when the detection result of synchronization code is normal.
Figure 13B:
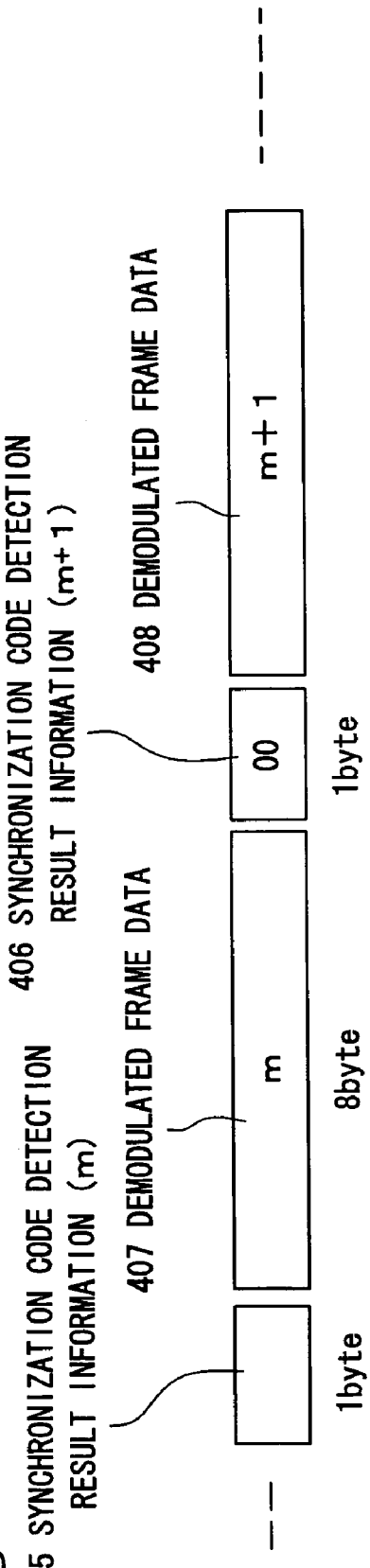
Figure 14:
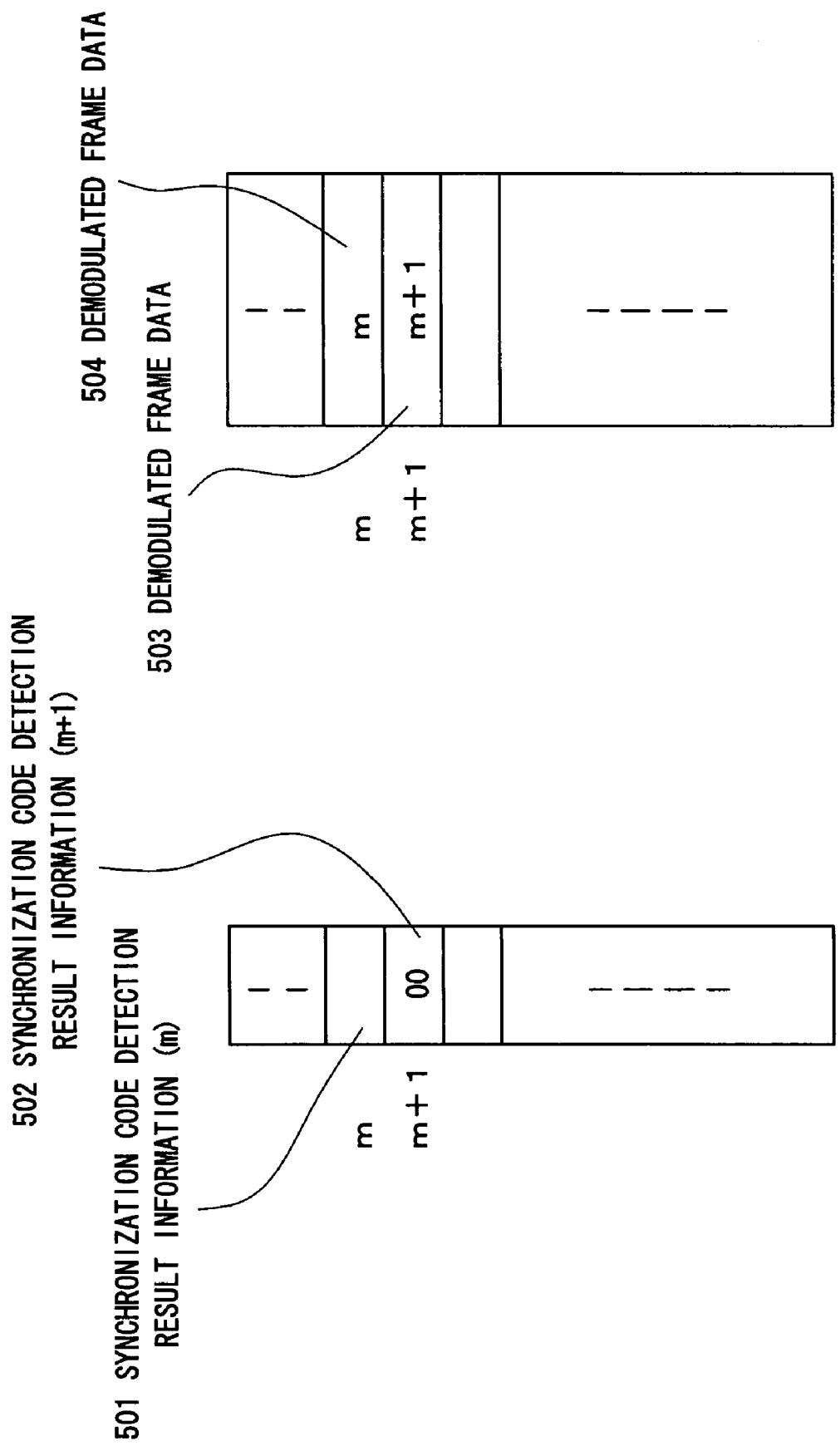
FIG. 14 shows how the result information for detection of synchronization code and the demodulated frame data in FIG. 13 are stored.

FIG. 13 and FIG. 14 show a first example in which the detection result of synchronization code is normal detection. FIG. 13A shows the data format of the playback signal input in frame synchronization step 301, and FIG. 13B shows the data format of the demodulated frame data and result information for detection of synchronization code passed from adding step 304 for adding the detection result of synchronization code to memory step 305.

In FIG. 13 the synchronization code 402 for frame m+1 is detected at precisely 128+32 bits from when the synchronization code 401 for frame m was detected. More specifically, the synchronization time of frame m+1 predicted by counting the clock from when the synchronization code 401 for frame m was detected matches the timing at which synchronization code 402 was actually detected.

In this case the detection result of synchronization code from frame synchronization step 301 is normal (00), and the result information for detection of synchronization code generating step 302 sets the low two bits of the result information for detection of synchronization code 406 for frame m+1 to 00. Because the result information for detection of synchronization code is 1 byte (8 bits) long, the highest 6 bits of the signal store the lowest six bits of the frame number (though not shown in the figure). In this example, therefore, result information for detection of synchronization code 406 stores the lowest six bits of m+1.

Based on frame synchronization by frame synchronization step 301, the modulated frame data 404 is demodulated by the demodulation step 303, resulting in demodulated frame data 408. Because (8,16) modulation is used in this second embodiment of the invention, the 128-bit modulated frame data is converted to 8 bytes of demodulated frame data.

The adding step 304 then prepends the result information for detection of synchronization code to each demodulated frame data block and sends the result to the memory step 305 for writing to memory in the error correcting circuit block. Because the result information for detection of synchronization code is added to each demodulated frame data block, correlation to the detection result of synchronization code for the demodulated frame data is also simple.

FIG. 14 shows storing the transferred demodulated frame data having the result information for detection of synchronization code prepended to the beginning thereof as shown in FIG. 13. As shown in FIG. 14 the result information for detection of synchronization code and the demodulated frame data are stored to separate areas in memory.

It will be obvious that storing data to different areas can be accomplished by storing the data to different blocks in the same memory device, or by storing the data to different memory devices.

The result information for detection of synchronization code and demodulated frame data are stored by frame number to a specific address in each memory area. For example, the lowest two bits of result information for detection of synchronization code 502 for frame m+1 are 00, and the data is stored to the address specified for frame m+1. The demodulated frame data 503 for frame m+1 is likewise stored to the address specified for frame m+1. Note that the demodulated frame data and corresponding result information for detection of synchronization code are stored linked to each other.

EXAMPLE 2

Figure 16:
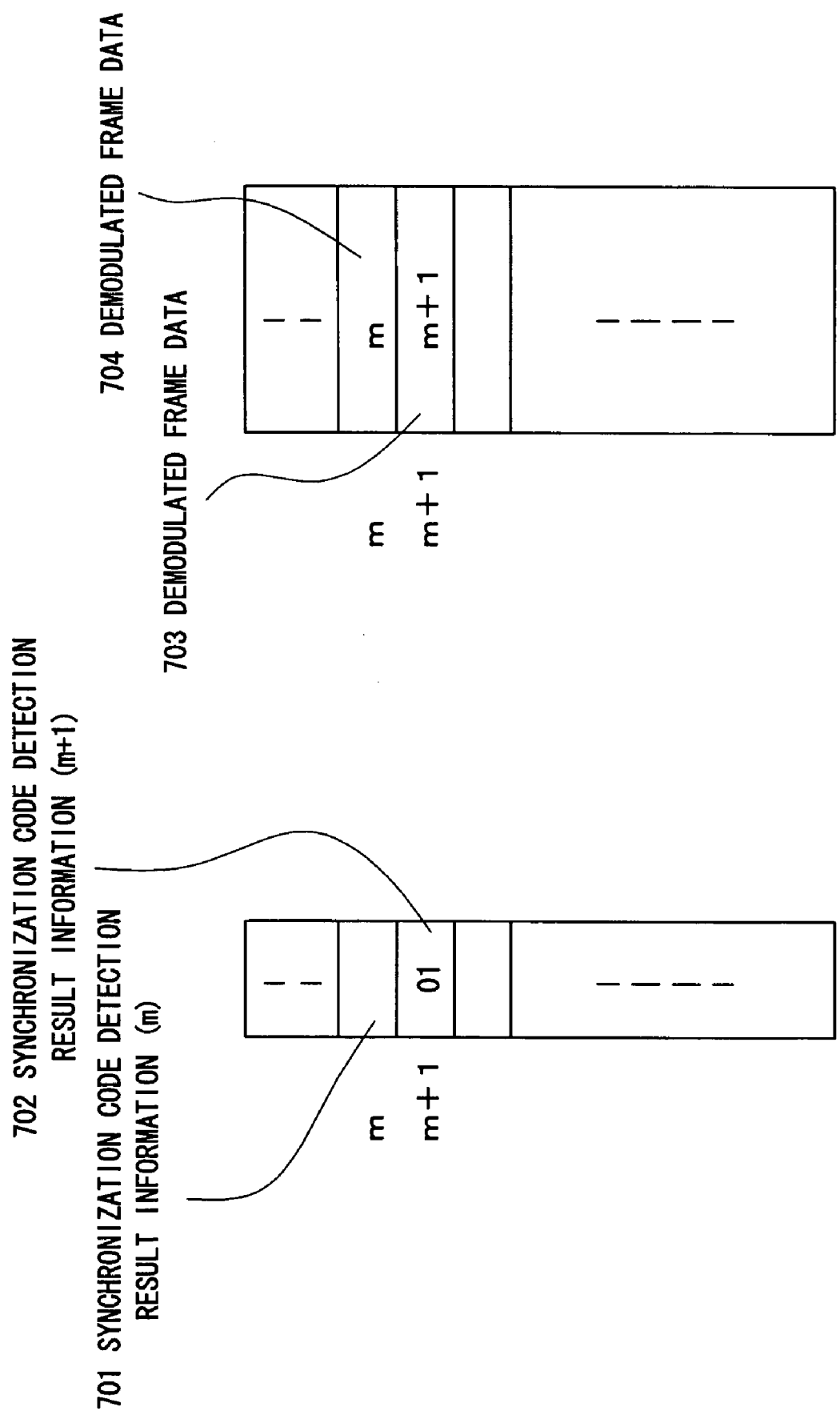
FIG. 16 shows how the result information for detection of synchronization code and the demodulated frame data in FIG. 15 are stored.

FIG. 15 and FIG. 16 show a second example in which the detection result of synchronization code is "undetected". FIG. 15A shows the data format of the playback signal input in frame synchronization step 301, and FIG. 15B shows the data format of the demodulated frame data and result information for detection of synchronization code passed from adding step 304 for adding the detection result of synchronization code to memory step 305.

In the example shown in FIG. 15 synchronization code 602 for frame m+1 is not detected due to a scratch on the disc, for example. The detection result of synchronization code returned by frame synchronization step 301 is therefore "undetected" and the low two bits of the result information for detection of synchronization code 606 for frame m+1 are set to 01 by the result information for detection of synchronization code generating step 302. Because the result information for detection of synchronization code is 1 byte (8 bits) long, the highest 6 bits of the signal store the lowest six bits of the frame number (though not shown in the figure). In this example, therefore, result information for detection of synchronization code 606 stores the lowest six bits of m+1.

Because the synchronization code 602 was not detected in frame synchronization step 301, the timing predicted by the clock count from the detection timing of synchronization code 601 in frame m is used for synchronization timing. Reliability is accordingly lower in this case.

Based on frame synchronization by frame synchronization step 301, the modulated frame data 604 is demodulated by the demodulation step 303, resulting in demodulated frame data 608. Because (8,16) modulation is used in this embodiment of the invention, the 128-bit modulated frame data is converted to 8 bytes of demodulated frame data.

The adding step 304 then prepends the result information for detection of synchronization code to each demodulated frame data block and sends the result to the memory step 305 for writing to memory in the error correcting circuit block. Because the result information for detection of synchronization code is added to each demodulated frame data block, correlation to the detection result of synchronization code for the demodulated frame data is also simple.

Demodulated frame data for which the result information for detection of synchronization code is set to "undetected" can therefore be easily identified.

FIG. 16 shows storing the transferred demodulated frame data having the result information for detection of synchronization code prepended to the beginning thereof as shown in FIG. 15. As shown in FIG. 16 the result information for detection of synchronization code and the demodulated frame data are stored to separate areas in memory.

The result information for detection of synchronization code and demodulated frame data are stored by frame number to a specific address in each memory area. For example, the lowest two bits of result information for detection of synchronization code 702 for frame m+1 are 01, and the data is stored to the address specified for frame m+1. The demodulated frame data 703 for frame m+1 is likewise stored to the address specified for frame m+1. Note that the demodulated frame data and corresponding result information for detection of synchronization code are stored linked to each other.

EXAMPLE 3

FIG. 17 and FIG. 18 show a third example in which the detection result of synchronization code is "out-of-step" because a new synchronization code was detected at a time different from that predicted from the timing of the detection result of the immediately preceding synchronization code. Synchronization correction is needed in this case.

Figure 17A:
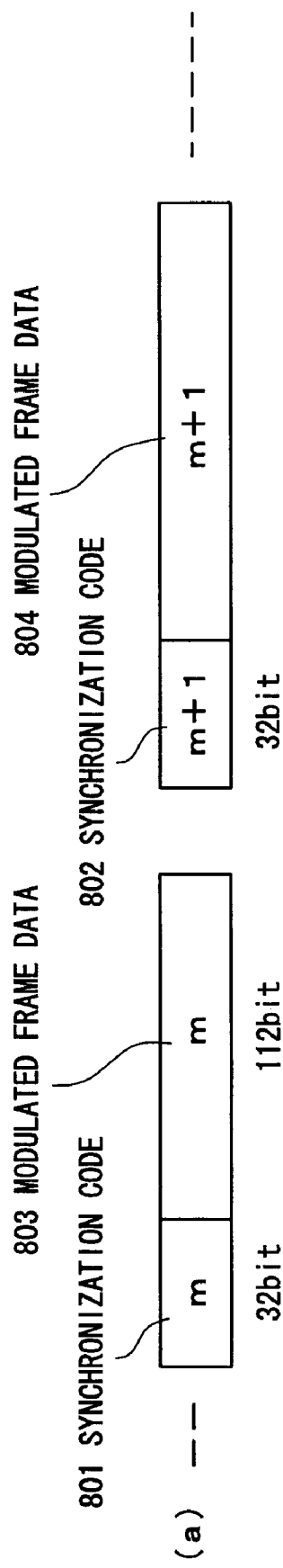
FIGS. 17A and 17B show the data structure in a third version of the first example of a playback method according to the second embodiment of the invention when the detection result of synchronization code is out-of-step synchronization.
Figure 17B:
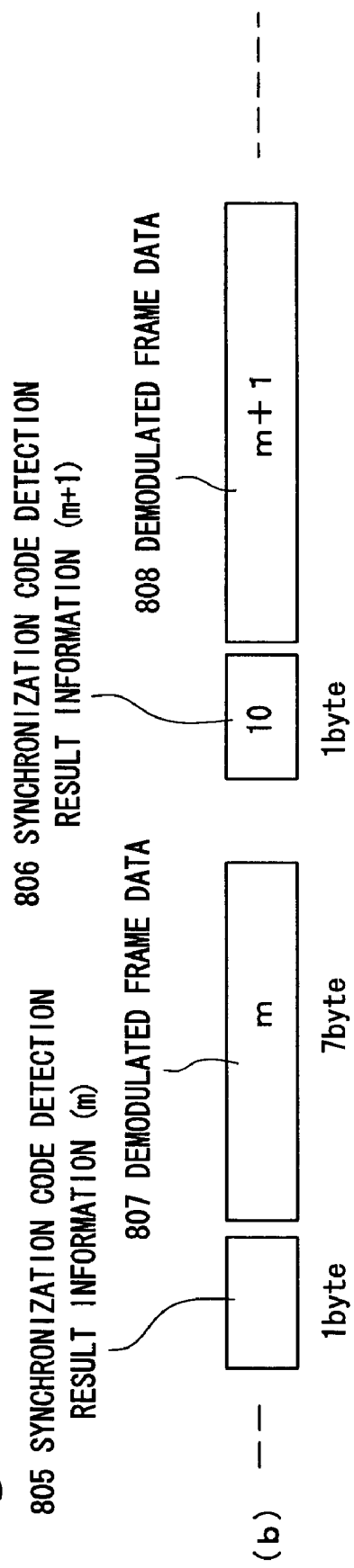

FIG. 17A shows the data format of the playback signal input in frame synchronization step 301, and FIG. 17B shows the data format of the demodulated frame data and result information for detection of synchronization code passed from adding step 304 for adding the detection result of synchronization code to memory step 305.

In the example shown in FIG. 17 the synchronization code 802 for frame m+1 should be detected at 32+128 bits from the timing at which frame m synchronization code 801 was detected. A drop in the clock frequency due, for example, to an out-of-step PLL results in the synchronization code being detected at 32+112 bits, that is, a synchronization delay from the normal timing.

The detection result of synchronization code is set to "correct synchronization" by the frame synchronization step 301 in this case, and the lowest two bits of the result information for detection of synchronization code 806 for frame m+1 are set by the result information for detection of synchronization code generating step 302 to 10.

Because the synchronization code 802 was detected at a timing offset from the timing predicted from the clock, the frame synchronization step 301 corrects synchronization to the timing of the detected synchronization code 802.

Based on frame synchronization by frame synchronization step 301, the modulated frame data 804 is demodulated by the demodulation step 303, resulting in demodulated frame data 808. Because (8,16) modulation is used in this embodiment of the invention, the 128-bit modulated frame data is converted to 8 bytes of demodulated frame data. The demodulated frame data 807 for frame m, however, is short bits and is therefore only 7 bytes.

The adding step 304 then prepends the result information for detection of synchronization code to each demodulated frame data block and sends the result to the memory step 305 for writing to memory in the error correcting circuit block. Because the result information for detection of synchronization code is added to each demodulated frame data block, correlation to the detection result of synchronization code for the demodulated frame data is also simple.

Demodulated frame data for which the result information for detection of synchronization code is set to "correct synchronization" can therefore be easily identified.

FIG. 18 shows storing the transferred demodulated frame data having the result information for detection of synchronization code prepended to the beginning thereof as shown in FIG. 17. As shown in FIG. 18 the result information for detection of synchronization code and the demodulated frame data are stored to separate areas in memory. Note that the demodulated frame data and corresponding result information for detection of synchronization code are stored linked to each other.

The result information for detection of synchronization code and demodulated frame data are stored by frame number to a specific address in each memory area. For example, the lowest two bits of result information for detection of synchronization code 902 for frame m+1 are 10, and the data is stored to the address specified for frame m+1. The demodulated frame data 903 for frame m+1 is likewise stored to the address specified for frame m+1. Note that the demodulated frame data and corresponding result information for detection of synchronization code are stored linked to each other.

Because the demodulated frame data for frame m in this case holds only 7 bytes, one byte is skipped before storing demodulated frame data 904 for frame m+1. It will be obvious that a byte can be thus skipped by providing a control signal that is sent with the transfer data from adding step 304 to memory step 305 and indicates whether the transfer data is result information for detection of synchronization code or demodulated frame data.

This first example of out-of-step synchronization detection refers to a synchronization delay of 1 byte, but also applies to correcting any synchronization delay of less than one frame.

EXAMPLE 4

FIG. 19 and FIG. 20 show a second example of the detection result of synchronization code being "out-of-step" because a new synchronization code was detected at a time different from that predicted from the timing of the detection result of the immediately preceding synchronization code. This example differs from the first example of out-of-step synchronization in that a synchronization advance of less than one frame is corrected.

Figure 19A:
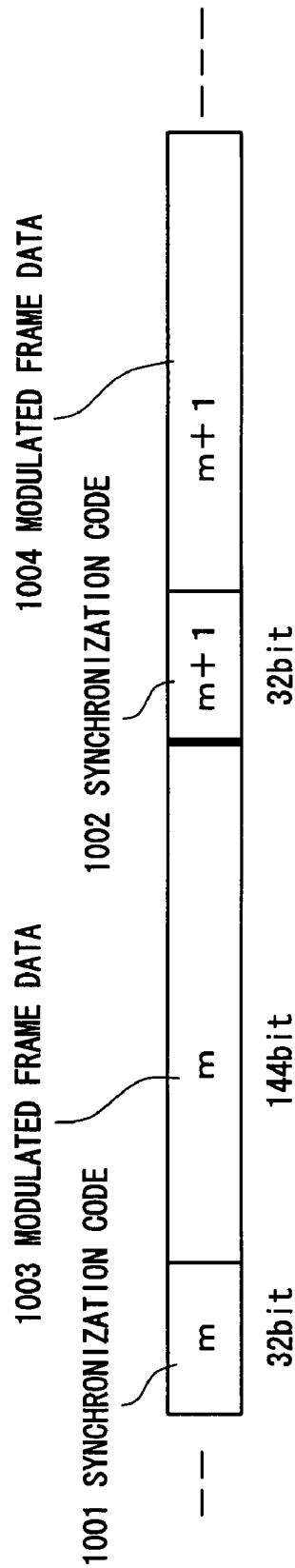
FIGS. 19A and 19B show the data structure in a fourth version of the second example of a playback method according to the second embodiment of the invention when the detection result of synchronization code is out-of-step synchronization.
Figure 19B:
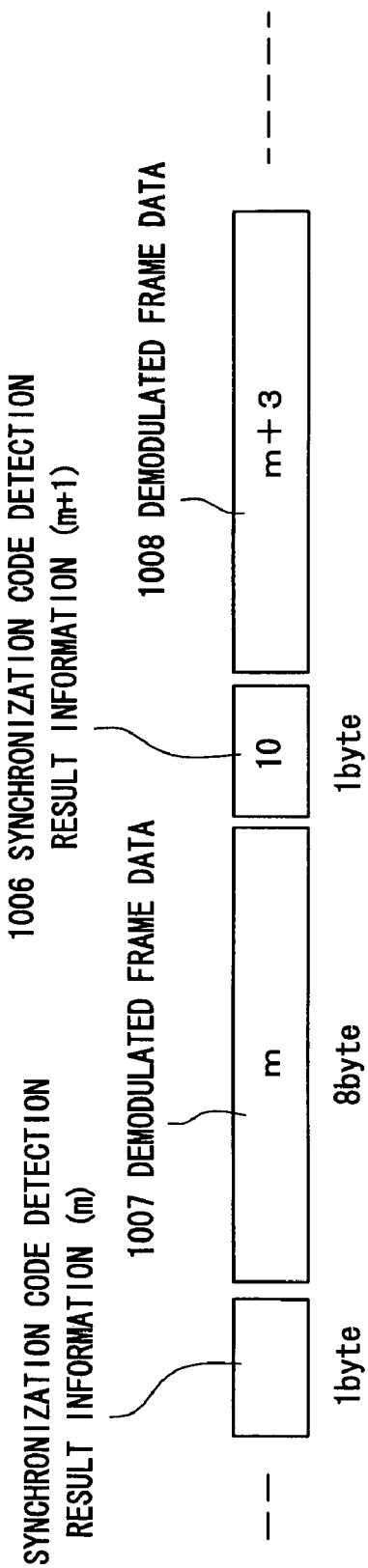

FIG. 19A shows the data format of the playback signal input in frame synchronization step 301, and FIG. 19B shows the data format of the demodulated frame data and result information for detection of synchronization code passed from adding step 304 to memory step 305.

In the example shown in FIG. 19 the synchronization code 802 for frame m+1 should be detected at 32+128 bits from the timing at which frame m synchronization code 1001 was detected. An increase in the clock frequency due, for example, to an out-of-step PLL results in the synchronization code being detected at 32+144 bits, that is, a synchronization advance from the normal timing.

The detection result of synchronization code is set to "out-of-step" (10) by the frame synchronization step 301 in this case, and the lowest two bits of the result information for detection of synchronization code 1006 for frame m+1 are set by the result information for detection of synchronization code generating step 302 to 10.

Because the synchronization code 1002 was detected at a timing offset from the timing predicted from the clock, the frame synchronization step 301 corrects synchronization to the timing of the detected synchronization code 1002.

Based on frame synchronization by frame synchronization step 301, the modulated frame data 1004 is demodulated by the demodulation step 303, resulting in demodulated frame data 1008. The demodulated frame data 1007 for frame m has extra bits in this case, but because the original demodulated frame data has a maximum 8 bytes, only the first 8 bytes of the demodulated frame data are transferred.

The adding step 304 then prepends the result information for detection of synchronization code to each demodulated frame data block and sends the result to the memory step 305 for writing to memory in the error correcting circuit block. Because the result information for detection of synchronization code is added to each demodulated frame data block, correlation to the detection result of synchronization code for the demodulated frame data is also simple.

Demodulated frame data for which the result information for detection of synchronization code is set to "correct synchronization" can therefore be easily identified.

FIG. 20 shows storing the transferred demodulated frame data having the result information for detection of synchronization code prepended to the beginning thereof as shown in FIG. 19. As shown in FIG. 20 the result information for detection of synchronization code and the demodulated frame data are stored to separate areas in memory. Note that the demodulated frame data and corresponding result information for detection of synchronization code are stored linked to each other.

The result information for detection of synchronization code and demodulated frame data are stored by frame number to a specific address in each memory area. For example, the lowest two bits of result information for detection of synchronization code 1102 for frame m+1 are 10, and the data is stored to the address specified for frame m+1. The demodulated frame data 1103 for frame m+1 is likewise stored to the address specified for frame m+1.

EXAMPLE 5

FIG. 21 and FIG. 22 show a third example of the detection result of synchronization code indicating that synchronization correction is needed because the next synchronization code was detected at a time different from that predicted from the timing of the immediately preceding synchronization code. This fifth example differs from the first and second synchronization correction examples above in that a synchronization delay of one whole frame or more is corrected.

Figure 21A:
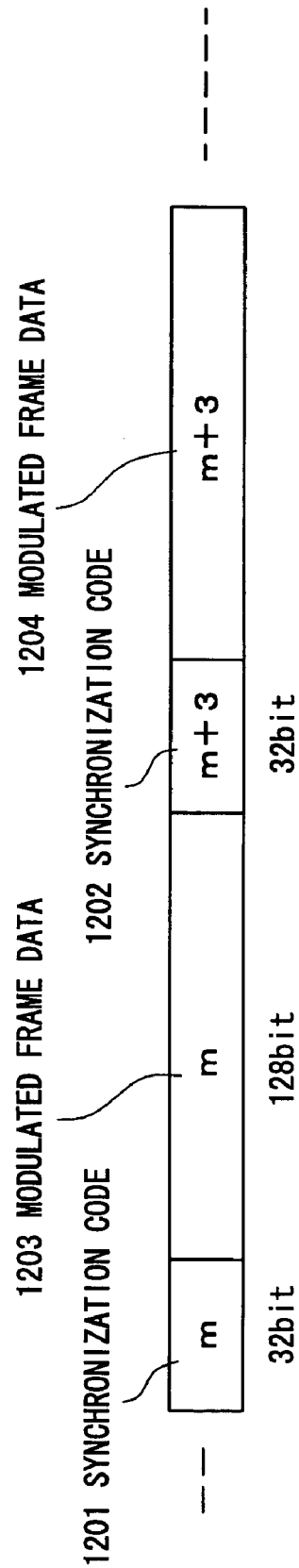
FIGS. 21A and 21B show the data structure in a fifth version of a third example of a playback method according to the second embodiment of the invention when the detection result of synchronization code is out-of-step synchronization.
Figure 21B:
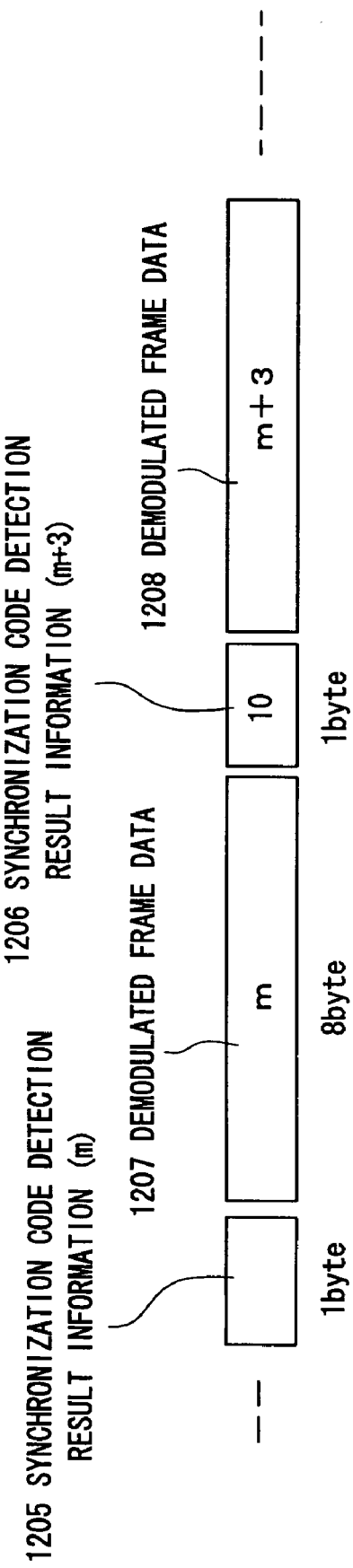

FIG. 21A shows the data format of the playback signal input in frame synchronization step 301, and FIG. 21B shows the data format of the demodulated frame data and result information for detection of synchronization code passed from adding step 304 to memory step 305.

In the example shown in FIG. 21 the synchronization code 1202 for frame m+3 is detected next after synchronization code 1201 for frame m was detected. The synchronization code for frame m+1 should have been detected, but a synchronization delay of one frame or more from the normal timing resulted from a sudden increase in the clock frequency due to an out-of-step PLL, for example.

The detection result of synchronization code is set to "out-of-step" (10) by the frame synchronization step 301 in this case, and the lowest two bits of the result information for detection of synchronization code 1206 for frame m+3 are set by the result information for detection of synchronization code generating step 302 to 10.

Because the synchronization code 1202 was detected at a timing offset from the timing predicted from the clock, the frame synchronization step 301 corrects synchronization to the timing of the detected synchronization code 1202.

Based on frame synchronization by frame synchronization step 301, the modulated frame data 1204 is demodulated by the demodulation step 303, resulting in demodulated frame data 1208.

The adding step 304 then prepends the result information for detection of synchronization code to each demodulated frame data block and sends the result to the memory step 305 for writing to memory in the error correcting circuit block. Because the result information for detection of synchronization code is added to each demodulated frame data block, correlation to the detection result of synchronization code for the demodulated frame data is also simple.

Demodulated frame data for which the result information for detection of synchronization code is set to "correct synchronization" can therefore be easily identified.

FIG. 22 shows storing the transferred demodulated frame data having the result information for detection of synchronization code prepended to the beginning thereof as shown in FIG. 21. As shown in FIG. 22 the result information for detection of synchronization code and the demodulated frame data are stored to separate areas in memory. Note that the demodulated frame data and corresponding result information for detection of synchronization code are stored linked to each other.

The result information for detection of synchronization code and demodulated frame data are stored by frame number to a specific address in each memory area. For example, the lowest two bits of result information for detection of synchronization code 1302 for frame m+3 are 10, and the data is stored to the address specified for frame m+3. The demodulated frame data 1303 for frame m+3 is likewise stored to the address specified for frame m+3.

The result information for detection of synchronization code and demodulated frame data for frames m+1 and m+2 were not received, and are therefore skipped and not stored. This can be easily accomplished by referencing the frame number stored to the high bits of the result information for detection of synchronization code.

When frame data is thus skipped and not stored, the code (01) indicating that the synchronization code was not detected is preferably stored to the skipped result information for detection of synchronization code. In this example, the result information for detection of synchronization code for frames m+1 and m+2 would therefore be stored with a type value of 01. Thus storing the undetected code (01) enables generating a erasure pointer to the skipped demodulated frame data as further described below.

A case in which a synchronization delay of one frame or more occurs immediately after a frame is detected normally is described above. It will be noted that the same process can be applied when the synchronization code is undetected for plural consecutive frames, a frame synchronization code is then detected, the clock is reset to this frame to predict the timing of the next synchronization code, and there is then a shift of one frame or more between the next-detected synchronization code and the timing at which that synchronization code was predicted.

EXAMPLE 6

Figure 23A:
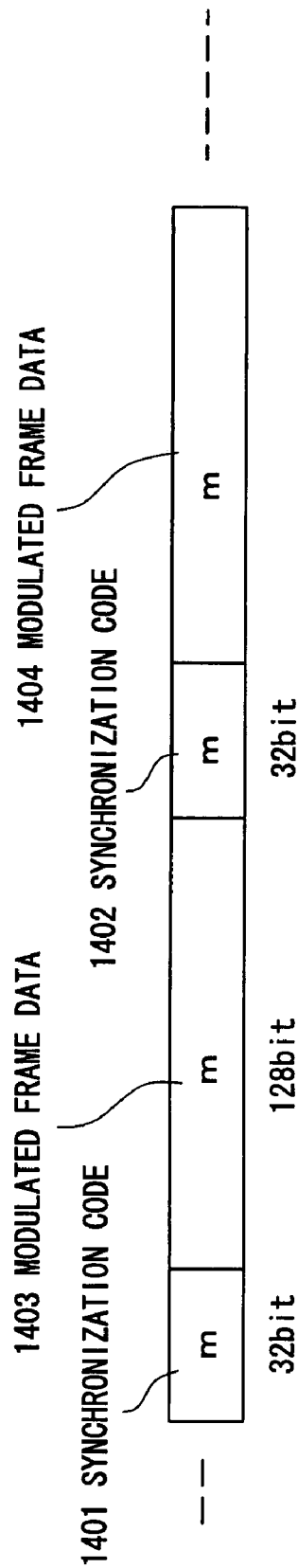
FIGS. 23A and 23B show the data structure in a sixth version of a fourth example of a playback method according to the second embodiment of the invention when the detection result of synchronization code is out-of-step synchronization.
Figure 23B:
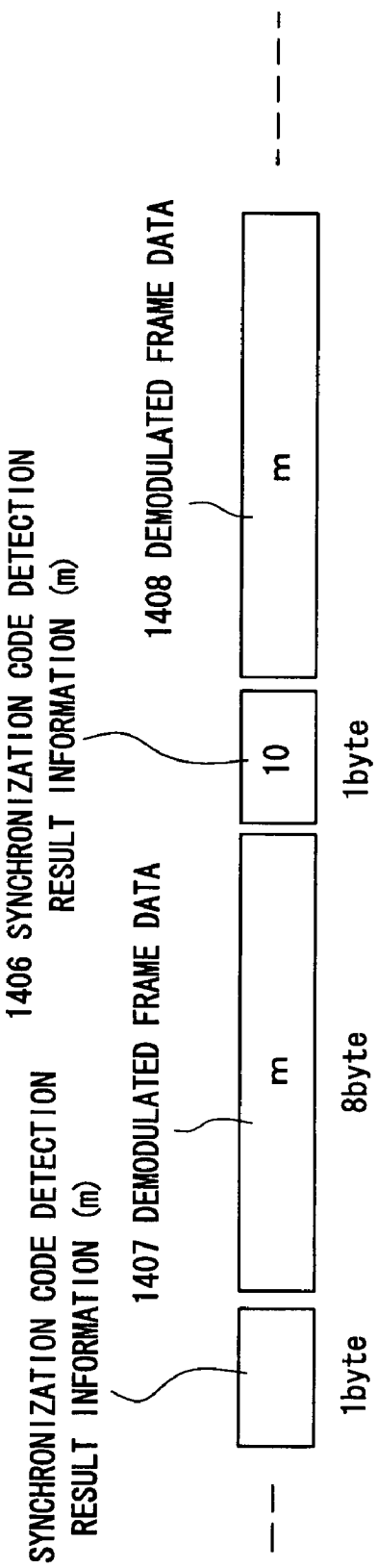
Figure 24:
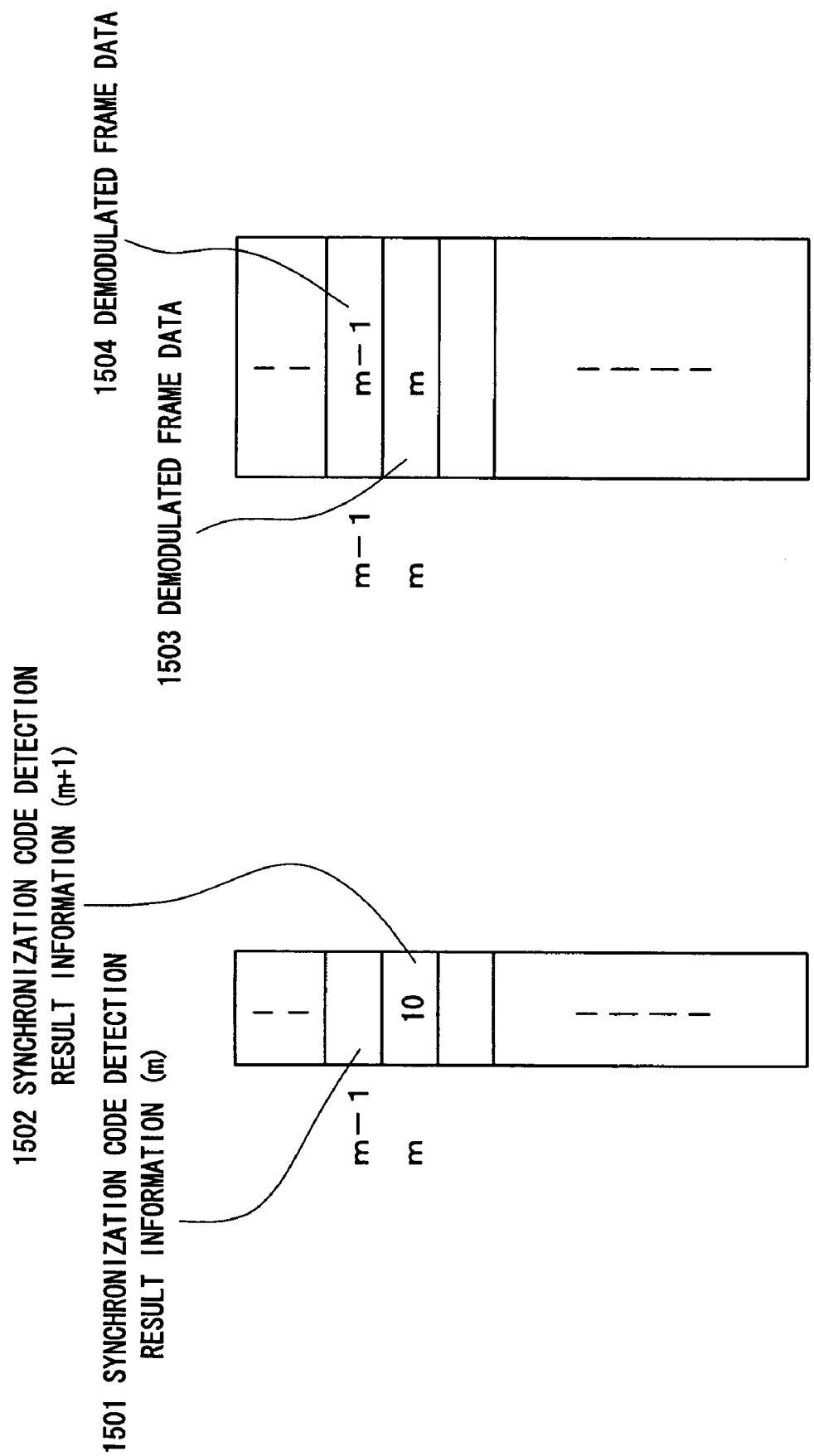
FIG. 24 shows how the result information for detection of synchronization code and the demodulated frame data in FIG. 23 are stored.

FIG. 23 and FIG. 24 show a fourth example in which synchronization correction is needed because the synchronization code is detected at a time different from that predicted from the timing of the preceding synchronization code. Conversely to the fifth example described above, a synchronization advance of one whole frame or more is corrected in this example.

FIG. 23A shows the data format of the playback signal input in frame synchronization step 301, and FIG. 23B shows the data format of the demodulated frame data and result information for detection of synchronization code passed from adding step 304 to memory step 305.

In the example shown in FIG. 23 synchronization code 1402 for frame m is detected again after synchronization code 1401 for frame m was detected. While the synchronization code for frame m+1 should have been detected here, this case can be processed in the same way as when the first frame m synchronization code 1401 is falsely detected, or when there is a shift of one frame or more between a newly detected synchronization code and where that synchronization code is predicted by counting the clock from the frame where a synchronization code is finally detected after the synchronization code is undetected for plural consecutive frames.

The detection result of synchronization code is set to "out-of-step" (10) by the frame synchronization step 301 in this case, and the lowest two bits of the result information for detection of synchronization code 1406 for frame m are set by the result information for detection of synchronization code generating step 302 to 10.

Because the synchronization code 1402 was detected at a timing offset from the timing predicted from the clock, the frame synchronization step 301 corrects synchronization to the timing of the detected synchronization code 1402.

Based on frame synchronization by frame synchronization step 301, the modulated frame data 1404 is demodulated by the demodulation step 303, resulting in demodulated frame data 1408.

The adding step 304 then prepends the result information for detection of synchronization code to each demodulated frame data block and sends the result to the memory step 305 for writing to memory in the error correcting circuit block. Because the result information for detection of synchronization code is added to each demodulated frame data block, correlation to the detection result of synchronization code for the demodulated frame data is also simple.

Demodulated frame data for which the result information for detection of synchronization code is set to "out-of-step" can therefore be easily identified.

Note that the data for frame m is sent twice in this example.

FIG. 24 shows storing the transferred demodulated frame data having the result information for detection of synchronization code prepended to the beginning thereof as shown in FIG. 23. As shown in FIG. 24 the result information for detection of synchronization code and the demodulated frame data are stored to separate areas in memory. Note that the demodulated frame data and corresponding result information for detection of synchronization code are stored linked to each other.

The result information for detection of synchronization code and demodulated frame data are stored by frame number to a specific address in each memory area. For example, the lowest two bits of result information for detection of synchronization code 1502 for frame m are 10, and the data is stored to the address specified for frame m. The demodulated frame data 1503 for frame m is likewise stored to the address specified for frame m.

The result information for detection of synchronization code and demodulated frame data for frame m are transferred twice in this example, and the data that is transferred and written first is then overwritten by the second set of data. Similarly to skipping an address block, this overwrite operation can be easily accomplished by referencing the frame number stored to the high bits of the result information for detection of synchronization code.

Synchronization code detection and synchronization corrected are described in detail above with reference to FIG. 13 to FIG. 24. Further preferably, however, a window for limiting the synchronization code detection range is provided with the size of the window variable according to the continuity of synchronization code detection and non-detection, thereby providing greater robustness to false synchronization code detection.

Figures 25A, 25B:
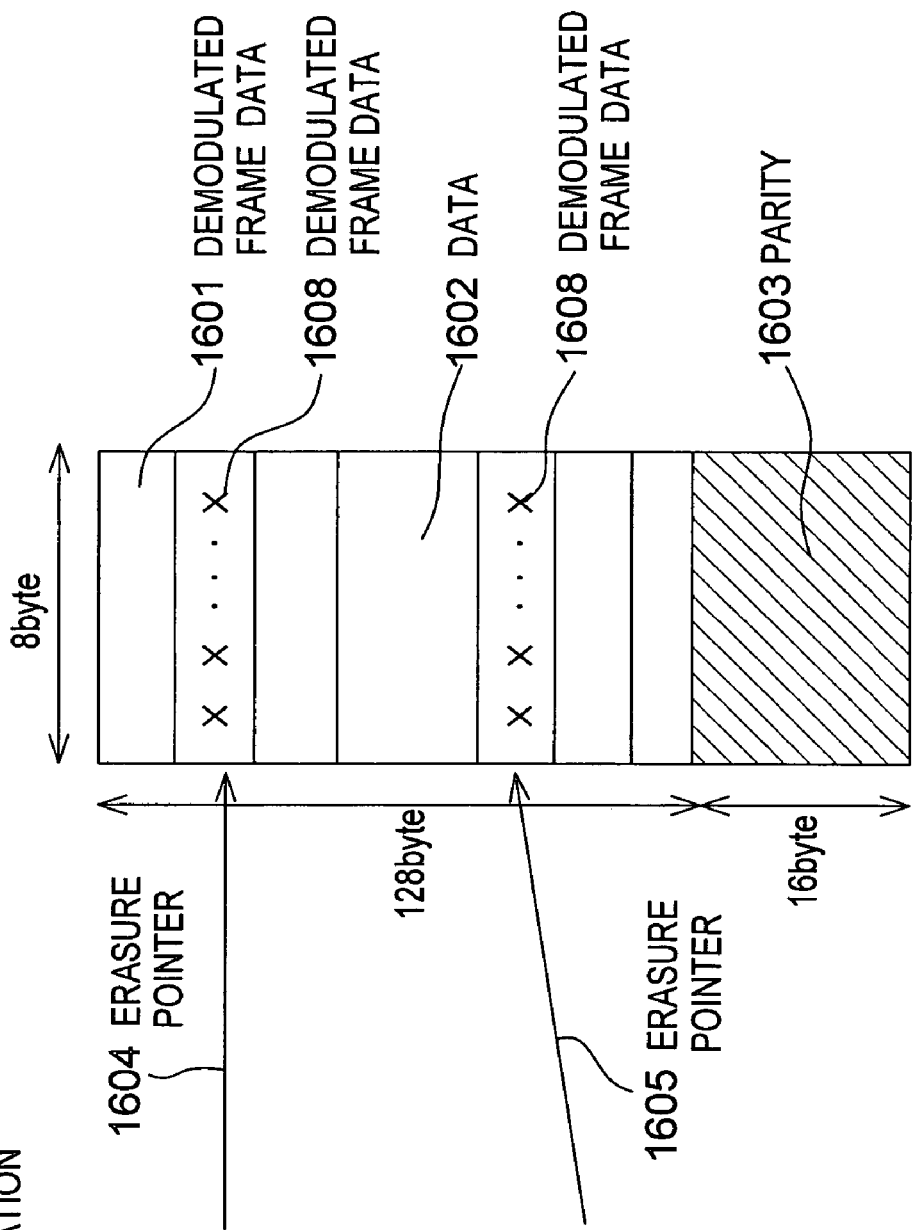
FIGS. 25A and 25B are schematic diagrams describing generating a erasure point in a playback method according to a second embodiment of the invention.

The erasure pointer generating step 306 is described in detail next with reference to FIG. 25. FIG. 25 shows generating a erasure pointer from result information for detection of synchronization code stored in memory to demodulated frame data stored in a different memory area. FIG. 25A shows the result information for detection of synchronization code, and FIG. 25B shows the demodulated frame data for the sector error correcting code, which as described above with reference to FIG. 10A is 8 bytes wide and 128 data bytes plus 16 parity bytes long. The erasure pointers are generated by frame data unit, i.e., in 8-byte wide rows as shown in FIG. 25.

As also described above, the result information for detection of synchronization code takes one of three values: 00 denoting normal synchronization code detection, 01 denoting the signal is not detected, and 10 denoting out-of-step synchronization.

(a) If the result is 00, normal detection, a erasure pointer is not generated for the corresponding demodulated frame data.

(b) If the result is 01, undetected (1606), the demodulated frame data 1608 for that frame is considered unreliable because synchronization was based only on the clock count from the previously detected synchronization code. A erasure pointer 1604 to this demodulated frame data 1608 is therefore generated.

(c) If the result is 10, out-of-step (1607), the demodulated frame data 1609 for the preceding frame is considered unreliable because synchronization correction was applied for frame synchronization detection. A erasure pointer 1605 to the demodulated frame data 1609 for the preceding frame is therefore generated.

Erasure correction is then applied to the code error positions indicated in the column direction by the erasure pointers. Erasure correction can improve by up to twice the number of corrections per code unit.

It should be noted that these erasure pointers can be generated by storing the row number, for example, where the corresponding demodulated frame data is stored in a register that can be referenced by the error correcting circuit during erasure error correction.

The playback method of this second embodiment of the invention described above can thus execute erasure correction by sending the result information for detection of synchronization code with the demodulated frame data to the error correcting circuit block and using this to generate erasure pointers as appropriate. High reliability data playback can therefore be achieved.

Embodiment 3

This third embodiment of the invention is a playback apparatus featuring a circuit design corresponding to the playback method described in the second embodiment above. FIG. 26 is a block diagram of this playback apparatus comprising a demodulation circuit block 1701 and error correction circuit block 1702. The demodulation circuit block 1701 has a frame synchronization circuit 1703, result information for detection of synchronization code generating circuit 1705, demodulation circuit 1704, and adding circuit 1706 for the detection result of synchronization code. The error correction circuit block 1702 has an error correction circuit 1710 and erasure pointer generating circuit 1709, and also uses external memory 1708 in the error correcting process.

Operation of this playback apparatus is described next.

(a) The playback signal 1713 from the optical disc is input to frame synchronization circuit 1703.

(b) The frame synchronization circuit 1703 detects the synchronization code at the beginning of each frame and synchronizes the frame. The detection result of synchronization code 1715 resulting from frame synchronization is then sent to the result information for detection of synchronization code generating circuit 1705. The modulated frame data 1714 is also sent to the demodulation circuit 1704. This frame synchronization circuit 1703 can be easily achieved using means such as a pattern comparison circuit or counter.

(c) The demodulation circuit 1704 demodulates the modulated frame data 1714 and outputs demodulated frame data 1716. This demodulation circuit 1704 is a demodulation circuit for (8,16) modulation as known from the literature.

(d) The result information for detection of synchronization code generating circuit 1705 codes the detection result of synchronization code 1715 according to a known rule. As described above, normal synchronization code detection is coded 00, signal non-detection is coded 01, and out-of-step synchronization is coded 10. The result information for detection of synchronization code generating circuit 1705 combines these result codes with the low six bits of the frame number to product the one-byte result information for detection of synchronization code 1717. The result information for detection of synchronization code generating circuit 1705 can be achieved with logic circuits, for example.

(e) The adding circuit 1706 then prepends the result information for detection of synchronization code 1717 to the beginning of the demodulated frame data 1716 for each frame and sends the result to error correction circuit block 1702. The adding circuit 1706 also sends a control signal 1721 for separating the result information for detection of synchronization code and the demodulated frame data with the transfer data 1719. The adding circuit 1706 could be a selector, for example.

(f) The splitting circuit 1707 then separates the transferred result information for detection of synchronization code and demodulated frame data using the control signal 1721. The separated result information for detection of synchronization code and demodulated frame data are then passed through bus control circuit 1711 and stored to separate areas in memory 1708. The splitting circuit 1707 can be easily achieved using two discrete address generating circuits, detailed description of which is omitted.

(g) The erasure pointer generating circuit 1709 then generates any erasure pointers from the result information for detection of synchronization code stored to memory 1708, and stores the pointers to a register than the error correction circuit 1710 can reference. This erasure pointer generating circuit 1709 could be a microprocessor.

(h) The error correction circuit 1710 applies erasure correction using the erasure pointers to the error correcting code from the demodulated frame data stored in memory. This error correction circuit 1710 could be a Reed-Solomon error correcting circuit as known from the literature.

(i) The interface control circuit 1712 then sends the error-corrected playback data 1720 stored in memory 1708 to an MPEG decoding circuit, for example. This interface control circuit 1712 could be an interface circuit to an ATAPI, SCSI, or other protocol control circuit.

(j) The bus control circuit 1711 controls the internal bus 1718 and reading/writing memory 1808.

The playback apparatus according to this third embodiment of the invention as described above thus sends the result information for detection of synchronization code with the demodulated frame data to the error correcting circuit block, and generates erasure pointers therefrom to enable erasure correction. High reliability data playback can thereby be achieved.

Frame synchronization, result information for detection of synchronization code, and erasure pointer generation are the same as in the second embodiment above, and further description thereof is thus omitted.

Embodiment 4

Figure 27:
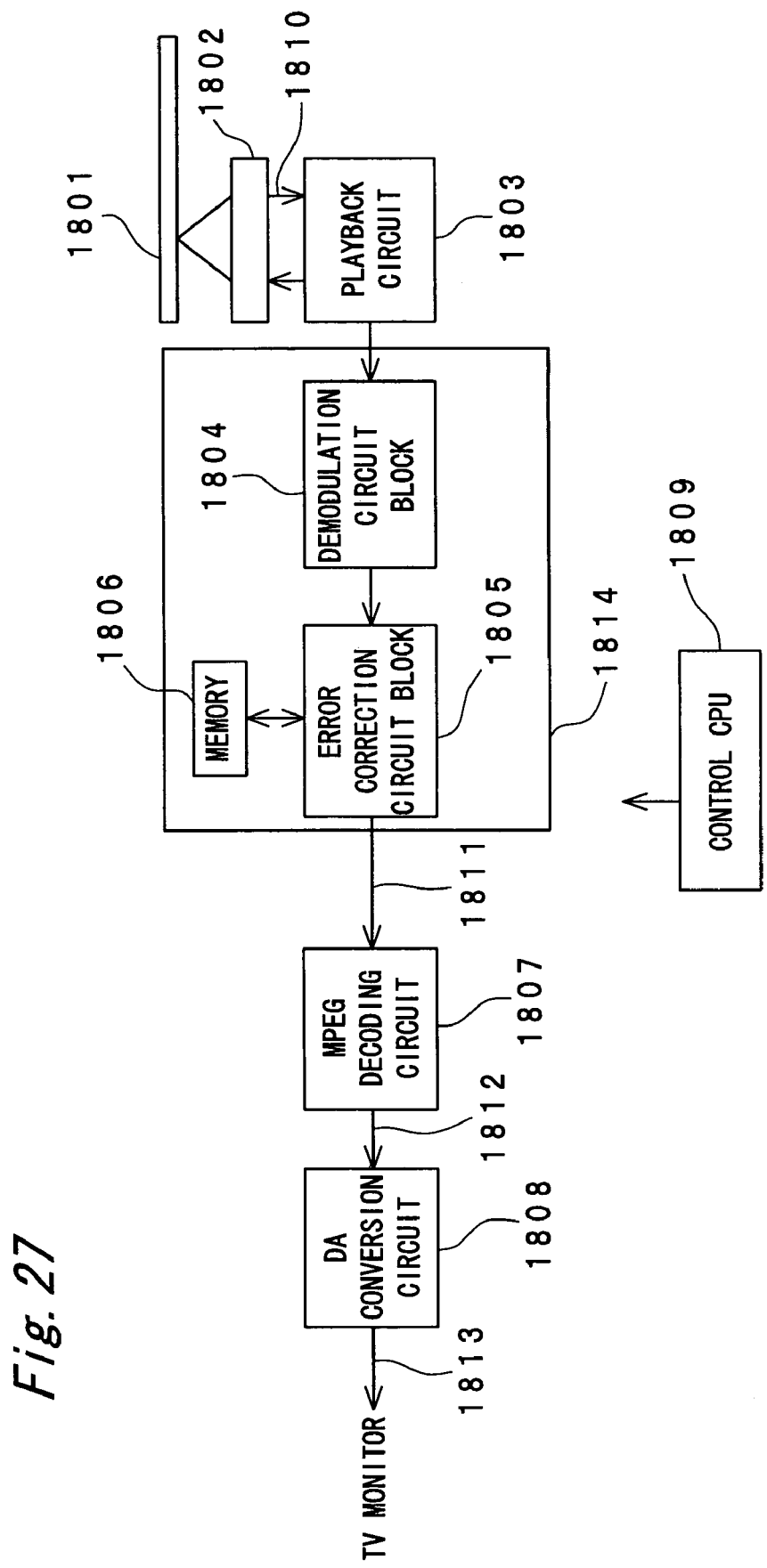
FIG. 27 is a block diagram showing the configuration of an optical disc playback device according to a fourth embodiment of the invention.

An optical disc drive comprising the playback control circuit 1814 according to the above third embodiment for playing content from an optical disc is described below according to a fourth embodiment of the invention. FIG. 27 is a block diagram of an optical disc drive for reproducing data from an optical disc 1801 storing compressed image data. In addition to the playback control circuit 1814 according to the third embodiment above, this optical disc drive has an optical head 1802 comprising a semiconductor laser and other optical elements, a playback circuit 1803 for digitizing an analog playback signal and generating a digital playback signal, an MPEG decoding circuit 1807 for decompressing MPEG-compressed data, a DA conversion circuit 1808, and a control CPU 1809 for controlling overall operation of the optical disc drive. The playback control circuit 1814 includes a demodulation circuit block 1804, error correction circuit block 1805, and memory 1806.

Operation of this optical disc drive is described next.

A laser beam from the semiconductor laser of the optical head 1802 is reflected to the optical head 1802 as reflected light modulated by the pits or dots formed on the recording surface of the optical disc 1801. This modulated reflected light is then converted to an electronic signal by a photoelectric element, and input to the playback circuit 1803 as an analog playback signal 1810. The playback circuit 1803 converts this analog signal to a digital signal, and outputs the resulting digital playback signal to the playback control circuit 1814.

As described in the third embodiment above, the playback control circuit 1814 applies frame synchronization, demodulation, and erasure correction using the erasure pointers generated from result information for detection of synchronization code. These operations are described in detail in the third embodiment above, and further description is therefore omitted here.

The error-corrected playback data 1811 is then decoded by the MPEG decoding circuit 1807. The decompressed playback data 1812 is then analog converted by the DA conversion circuit 1808, and sent to a TV or other presentation system as AV signal 1813.

Operation of this optical disc drive is controlled by the control CPU 1809. It should be noted that control signals and servo circuits for focusing and tracking are not shown in the figure.

The optical disc drive according to this fourth embodiment of the invention adds result information for detection of synchronization code to the corresponding demodulated frame data, sends the result to the error correcting circuit block, and thus generates erasure pointers for identifying specific demodulated frame data to which erasure correction is then applied. Data can therefore be reproduced with high reliability.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

The present disclosure relates to subject matter contained in Japanese Patent Application Nos. 2002-326492, filed on Nov. 11, 2002, and 2002-328054, filed on Nov. 12, 2002, the contents of both are herein expressly incorporated by reference in their entireties.

What is claimed is:

1. A playback method for a recording medium to which data is recorded in block units containing multiple fixed-length frames, and block address information is pre-recorded, the playback method comprising:

acquiring the data from a first playback signal from the recording medium;

acquiring the block address information from a second playback signal based on pre-recorded block address information from the recording medium;

predicting the recording position of each frame in a block from the acquired block address information;

synchronizing to a frame level based on the acquired data;

determining a memory address for storing the data acquired based on the predicted recording position; and storing the acquired data at the determined memory address.

2. A playback method for a recording medium according to claim 1, further comprising:

determining whether synchronization at the data frame unit level has been established; and detecting whether synchronization at the frame unit has been restored if frame synchronization goes out-of-step, wherein when recovery of frame synchronization is detected, the memory address to which data is stored is determined based on the predicted frame recording position.

3. A playback method for a recording medium according to claim 1, wherein the memory address is determined with a frame as a smallest recordable unit.

4. A playback method for a recording medium according to claim 1, wherein block address information is recorded to the recording medium in a format different from a data recording format.

5. A playback method for a recording medium according to claim 1, further comprising:

generating a result information for detection of synchronization code coded at the frame unit level according to specific rules;

demodulating the data in each frame to demodulated frame data; and adding to each demodulated frame data block the result information for detection of synchronization code correlated to each frame.

6. A playback method for a recording medium according to claim 1, further comprising synchronizing at the frame unit level based on the acquired address information.

7. A playback control circuit for a recording medium to which data is recorded in block units containing multiple fixed-length frames, and block address information is pre-recorded, comprising:

a signal reader that acquires the data from a first playback signal from the recording medium, and acquires the block address information from a second playback signal based on pre-recorded block address information from the recording medium;

a recording address predictor that predicts the recording position of each frame in a block from the acquired block address information;

a synchronizer that synchronizes to the frame level based on the acquired data;

a memory that stores the data; and a controller that determines the memory address for storing data based on the predicted recording position.

8. A playback control circuit according to claim 7, further comprising a synchronization detector that determines whether synchronization at the data frame unit level has been established, and detects whether synchronization at the frame unit has been restored if frame synchronization goes out-of-step, wherein the controller determines the memory address to which data is stored based on the recording position predicted by the recording address predictor when the synchronization detector detects recovery of frame synchronization.

9. A playback control circuit according to claim 7, wherein a data memory address in memory is determined with the frame as the smallest recordable unit.

10. A playback apparatus for a recording medium to which data is recorded in block units containing multiple fixed-length frames together with block address information, comprising the playback control circuit according to claim 7.

11. A playback method for reproducing data from a recording medium to which is recorded modulated frame data and a specific synchronization code prepended to the beginning of the modulated frame data,
the modulated frame data being error correction coded data segmented into multiple frame data blocks of a specific length and then modulated,
the playback method comprising:
acquiring signals from the recording medium;
acquiring a detection result of synchronization code by detecting frame synchronization codes from the acquired signals;
correcting frame synchronization based on the result for detection of acquired synchronization code;
generating a result information for detection of synchronization code coded according to specific rules from the detection result of synchronization code;
demodulating the modulated frame data for each frame and generating demodulated frame data;
adding the result information for detection of synchronization code for each frame to the corresponding demodulated frame data; and
correcting an error according to the detected synchronization code.

12. A playback method according to claim 11, wherein correcting an error comprises:
generating an erasure pointer for erasure-correction based on the demodulated frame data using the corresponding result information for detection of synchronization code; and
erasure-correction error correcting code from multiple demodulated frame data blocks using the erasure pointers for the demodulated frame data.

13. A playback method according to claim 11, further comprising:
a memory that stores the result information for detection of synchronization code and corresponding demodulated frame data in different memory areas with a known correlation therebetween.

14. A playback method according to claim 11, wherein the result information for detection of synchronization code is coded to differentiate between at least three detection results of "normal detection" when the synchronization code is detected normally, "undetected" when the synchronization code is not detected, and "out-of-step synchronization" when a next synchronization code is detected at a timing offset from a timing predicted from the timing of the detection result for the previously detected synchronization code.

15. A playback method according to claim 11, wherein when correcting frame synchronization corrects synchronization delay in which a new synchronization code is detected earlier than the timing predicted from the timing of the detection result of the previously detected synchronization code, and the synchronization delay is less than one frame, the memory corrects the memory address of the frame data immediately after synchronization delay correction to an address derived by skipping an amount equivalent to the synchronization delay correction, and stores the frame data to the corrected address.

16. A playback method according to claim 15, wherein when correcting frame synchronization corrects synchronization delay in which a new synchronization code is detected earlier than the timing predicted from the timing of the previously detected synchronization code, and the synchronization delay is greater than or equal to one frame,
the memory corrects the memory address of the result information for detection of synchronization code and frame data immediately after synchronization delay correction to an address shifted equivalently to the correction for the synchronization delay, and then stores the data to the corrected address; and
an erasure pointer generator determines that result information for detection of synchronization code that is skipped and not stored to memory was undetected, and generates an erasure pointer thereto.

17. A playback control circuit for reproducing data from a recording medium to which is recorded modulated frame data and a specific synchronization code prepended to the beginning of the modulated frame data,
the modulated frame data being error correction coded data segmented into multiple frame data blocks of a specific length and then modulated,
the playback control circuit comprising:
a frame synchronizer that corrects frame synchronization based on a detection result of synchronization code acquired by detecting frame synchronization codes from playback signals acquired from the recording medium;
a generator that generates a result information for detection of synchronization code coded according to specific rules from the detection result of synchronization code;
a demodulator that demodulates the modulated frame data for each frame and generating demodulated frame data;
an adder that prepends the result information for detection of synchronization code for a frame to the beginning of the demodulated frame data;
a memory that stores the result information for detection of synchronization code and demodulated frame data;
a memory controller that stores the result information for detection of synchronization code and demodulated frame data to memory; and
a corrector that rectifies an error according to the detected synchronization code.

18. A playback control circuit according to claim 17, further comprising:
an erasure pointer generator that generates an erasure pointer for erasure-correction using the result information for detection of synchronization code; and
an error corrector that erasure-corrects error correcting code composed from demodulated frame data using the erasure pointers.

19. A playback control circuit according to claim 17, wherein the memory controller stores the result information for detection of synchronization code and demodulated frame data to different memory areas.

20. A playback control circuit according to claim 17, wherein the result information for detection of synchronization code is coded to differentiate between at least three detection results of "normal detection" when the synchronization code is detected normally, "undetected" when the synchronization code is not detected, and "out-of-step synchronization" when a next synchronization code is detected at a timing offset from a timing predicted from the timing of the detection result for the previously detected synchronization code.

21. A playback control circuit according to claim 17, wherein when the frame synchronization means corrects synchronization delay in which a new synchronization code is detected earlier than the timing predicted from the timing of the previously detected synchronization code, and the synchronization delay is less than one frame, the memory controller corrects the memory address of the frame data immediately after synchronization delay correction to an address derived by skipping an amount equivalent to the synchronization delay correction, and stores the frame data to the corrected address.

22. A playback control circuit according to claim 21, wherein when the frame synchronizer corrects synchronization delay in which a new synchronization code is detected earlier than the timing predicted from the timing of the previously detected synchronization code, and the synchronization delay is at least equal to one frame, the memory controller corrects the memory address of the result information for detection of synchronization code and frame data immediately after synchronization delay correction to an address shifted equivalently to the correction for synchronization delay, and then stores the frame data to the corrected address; and the erasure pointer generator determines that result information for detection of synchronization code correspond to a frame that is skipped and not stored to memory was undetected, and generates a erasure pointer thereto.

23. A playback apparatus for reproducing data from a recording medium to which is recorded modulated frame data and a specific synchronization code prepended to the beginning of the modulated frame data, the modulated frame data being error correction coded data segmented into multiple frame data blocks of a specific length and then modulated, the playback apparatus comprising the playback control circuit according to claim 17.

* * * * *